US008610786B2

(12) United States Patent
Ortiz

(10) Patent No.: US 8,610,786 B2
(45) Date of Patent: *Dec. 17, 2013

(54) PROVIDING MULTIPLE VIDEO PERSPECTIVES OF ACTIVITIES THROUGH A DATA NETWORK TO A REMOTE MULTIMEDIA SERVER FOR SELECTIVE DISPLAY BY REMOTE VIEWING AUDIENCES

(75) Inventor: Luis M. Ortiz, Albuquerque, NM (US)

(73) Assignee: Front Row Technologies, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,793

(22) Filed: Feb. 2, 2012

(65) Prior Publication Data

US 2012/0133772 A1  May 31, 2012

Related U.S. Application Data

(63) Continuation of application No. 12/844,122, filed on Jul. 27, 2010, now Pat. No. 8,184,169, which is a continuation of application No. 12/210,971, filed on Sep. 15, 2008, now Pat. No. 7,782,363, which is a continuation-in-part of application No. 10/620,098, filed on Jul. 14, 2003, now Pat. No. 7,796,162, which is a continuation-in-part of application No. 09/708,776, filed on Nov. 8, 2000, now Pat. No. 7,149,549, said application No. 12/210,971 is a continuation-in-part of application No. 09/902,348, filed on Jul. 10, 2001, now Pat. No. 7,812,856, and a continuation-in-part of application No. 10/015,458, filed on Dec. 13, 2001, and a continuation-in-part of application No. 11/864,052, filed on Sep. 28, 2007, which is a continuation of application No. 11/498,415, filed on Aug. 2, 2006, now Pat. No. 7,376,388, which is a continuation of application No. 09/708,776, filed on Nov. 8, 2000, now Pat. No. 7,149,549, said application No. 11/498,415 is a continuation of application No. 09/887,492, filed on Jun. 22, 2001, now Pat. No. 7,630,721.

(60) Provisional application No. 60/243,561, filed on Oct. 26, 2000, provisional application No. 60/214,339, filed on Jun. 27, 2000.

(51) Int. Cl.
*H04N 5/232* (2006.01)

(52) U.S. Cl.
USPC ...................................................... 348/211.8

(58) Field of Classification Search
USPC ........... 348/143, 207.1, 211.99, 211.1–211.3, 348/211.11, 333.05
See application file for complete search history.

(56) References Cited

U.S. PATENT DOCUMENTS 4,183,056 A   1/1980   Evans et al.
4,443,387 A   4/1984   Gordon (Continued)

FOREIGN PATENT DOCUMENTS

EP          0 934 765 A1    8/1999
WO          WO 01/31497 A1  5/2001

OTHER PUBLICATIONS

"3Com: Don't Get Up, Sports Fans," *USA Today*, Tech Report, Aug. 22, 2000, pp. 1-2.

(Continued)

*Primary Examiner* — Gevell Selby
(74) *Attorney, Agent, or Firm* — Kermit D. Lopez; Luis M. Ortiz; Ortiz & Lopez, PLLC

(57) ABSTRACT

Multiple visual perspectives in video of private and public activities including those in public areas such as entertainment venues captured by cameras located near the activities can be transmitted over data networks to a server where video-related data is processed and recorded for selective display by authorized, remote video display devices (e.g., HDTV, set-top boxes, computers, handheld devices) in wired/wireless communication with the server. Users can be registered and authorized to access the server to provide/access video captured by cameras at activities. Wireless handheld devices can selectively retrieve video-related data captured at activities for server storage and subsequent display by video display devices. Captured video/pictures can be organized in a server based on at least one of: activity title, activity time, activity date, activity place, wireless handheld device location at time of video recording, distance from location of interest. Simultaneous display of multiple videos on a display can be synchronized.

20 Claims, 13 Drawing Sheets

(56) References Cited

U.S. PATENT DOCUMENTS

| | | |
|---|---|---|
| 4,994,909 A | 2/1991 | Graves et al. |
| 5,159,592 A | 10/1992 | Perkins |
| 5,164,827 A | 11/1992 | Paff |
| 5,243,415 A | 9/1993 | Vance |
| 5,295,180 A | 3/1994 | Vendetti et al. |
| 5,299,117 A | 3/1994 | Farnbach |
| 5,299,177 A | 3/1994 | Koch |
| 5,413,345 A | 5/1995 | Nauck |
| 5,422,816 A | 6/1995 | Sprague et al. |
| 5,448,291 A | 9/1995 | Wickline |
| 5,485,504 A | 1/1996 | Ohnsorge |
| 5,513,384 A | 4/1996 | Brennan et al. |
| 5,530,924 A | 6/1996 | Miller |
| 5,546,538 A | 8/1996 | Cobbley et al. |
| 5,561,712 A | 10/1996 | Nishihara |
| 5,568,205 A | 10/1996 | Hurwitz |
| 5,585,850 A | 12/1996 | Schwaller |
| 5,598,208 A | 1/1997 | McClintock |
| 5,600,368 A | 2/1997 | Matthew, III |
| 5,613,191 A | 3/1997 | Hylton et al. |
| 5,621,732 A | 4/1997 | Osawa |
| 5,627,915 A | 5/1997 | Rosser et al. |
| 5,663,717 A | 9/1997 | DeLuca |
| 5,673,317 A | 9/1997 | Cooper |
| 5,689,549 A | 11/1997 | Bertocci et al. |
| 5,708,961 A | 1/1998 | Hylton et al. |
| 5,724,492 A | 3/1998 | Matthews, III et al. |
| 5,726,660 A | 3/1998 | Purdy et al. |
| 5,729,471 A | 3/1998 | Jain et al. |
| 5,758,088 A | 5/1998 | Bezaire et al. |
| 5,760,824 A | 6/1998 | Hicks, III |
| 5,760,848 A | 6/1998 | Cho |
| 5,761,697 A | 6/1998 | Curry et al. |
| 5,768,151 A | 6/1998 | Lowy et al. |
| 5,793,416 A | 8/1998 | Rostoker et al. |
| 5,797,089 A | 8/1998 | Nguyen |
| 5,806,005 A | 9/1998 | Hull et al. |
| 5,808,695 A | 9/1998 | Rosser et al. |
| 5,812,819 A | 9/1998 | Rodwin et al. |
| 5,822,324 A | 10/1998 | Kostresti et al. |
| 5,826,185 A | 10/1998 | Wise et al. |
| 5,835,858 A | 11/1998 | Vaihoja et al. |
| 5,841,122 A | 11/1998 | Kirchhoff |
| 5,847,612 A | 12/1998 | Birleson |
| 5,847,762 A | 12/1998 | Canfield et al. |
| 5,870,465 A | 2/1999 | Hosbach et al. |
| 5,878,211 A | 3/1999 | Delagrange et al. |
| 5,884,957 A | 3/1999 | Shoen et al. |
| 5,892,554 A | 4/1999 | DiCicco et al. |
| 5,894,320 A | 4/1999 | Vancelette |
| 5,920,701 A | 7/1999 | Miller et al. |
| 5,933,773 A | 8/1999 | Barvesten |
| 5,946,635 A | 8/1999 | Dominguez |
| D413,881 S | 9/1999 | Ida et al. |
| 5,953,056 A | 9/1999 | Tucker |
| 5,953,076 A | 9/1999 | Astle et al. |
| 5,959,539 A | 9/1999 | Adolph et al. |
| 5,979,757 A | 11/1999 | Tracy et al. |
| 5,982,445 A | 11/1999 | Eyer et al. |
| 5,990,958 A | 11/1999 | Bheda et al. |
| 5,991,382 A | 11/1999 | Bayless et al. |
| 5,991,399 A | 11/1999 | Graunke et al. |
| 5,991,498 A | 11/1999 | Young |
| 5,999,124 A | 12/1999 | Sheynblat |
| 5,999,808 A | 12/1999 | LaDue |
| 6,002,720 A | 12/1999 | Yurt et al. |
| 6,002,995 A | 12/1999 | Suzuki et al. |
| 6,005,599 A | 12/1999 | Asai et al. |
| 6,005,611 A | 12/1999 | Gullichsen et al. |
| 6,005,927 A | 12/1999 | Rahrer et al. |
| 6,006,105 A | 12/1999 | Rostoker et al. |
| 6,009,336 A | 12/1999 | Harris et al. |
| 6,016,348 A | 1/2000 | Blatter et al. |
| 6,023,606 A | 2/2000 | Monte et al. |
| 6,026,119 A | 2/2000 | Funk et al. |
| 6,034,621 A | 3/2000 | Kaufman |
| 6,034,716 A | 3/2000 | Whiting et al. |
| 6,043,837 A | 3/2000 | Driscoll, Jr. et al. |
| 6,049,718 A | 4/2000 | Stewart |
| 6,064,860 A | 5/2000 | Ogden |
| D426,527 S | 6/2000 | Sakaguchi |
| 6,073,124 A | 6/2000 | Krishnan et al. |
| 6,073,171 A | 6/2000 | Gaughan et al. |
| 6,078,954 A | 6/2000 | Lakey et al. |
| 6,095,423 A | 8/2000 | Houdeau et al. |
| 6,100,925 A | 8/2000 | Rosser et al. |
| 6,104,414 A | 8/2000 | Odryna et al. |
| 6,118,493 A | 9/2000 | Duhault et al. |
| 6,121,966 A | 9/2000 | Teodosio et al. |
| 6,124,862 A | 9/2000 | Boyken et al. |
| 6,128,143 A | 10/2000 | Nalwa |
| 6,131,025 A | 10/2000 | Riley et al. |
| 6,133,946 A | 10/2000 | Cavallaro et al. |
| 6,137,525 A | 10/2000 | Lee et al. |
| 6,144,402 A | 11/2000 | Norsworthy et al. |
| 6,144,702 A | 11/2000 | Yurt et al. |
| 6,154,250 A | 11/2000 | Honey et al. |
| 6,167,092 A | 12/2000 | Lengwehasatit |
| 6,169,568 B1 | 1/2001 | Shigetomi |
| 6,175,517 B1 | 1/2001 | Jigour et al. |
| 6,192,257 B1 | 2/2001 | Ray |
| 6,204,843 B1 | 3/2001 | Freeman et al. |
| 6,215,484 B1 | 4/2001 | Freeman et al. |
| 6,222,937 B1 | 4/2001 | Cohen et al. |
| 6,227,974 B1 | 5/2001 | Eilat et al. |
| 6,252,586 B1 | 6/2001 | Freeman et al. |
| 6,256,019 B1 | 7/2001 | Allport |
| 6,269,483 B1 | 7/2001 | Broussard |
| 6,271,752 B1 | 8/2001 | Vaios |
| 6,289,464 B1 | 9/2001 | Wecker et al. |
| 6,295,094 B1 | 9/2001 | Cuccia |
| 6,317,039 B1 | 11/2001 | Thomason |
| 6,317,776 B1 | 11/2001 | Broussard et al. |
| 6,359,902 B1 | 3/2002 | Putzolu |
| 6,400,264 B1 | 6/2002 | Hsieh |
| 6,405,371 B1 | 6/2002 | Oosterhout et al. |
| 6,424,369 B1 | 7/2002 | Adair et al. |
| 6,434,403 B1 | 8/2002 | Ausems et al. |
| 6,434,530 B1 | 8/2002 | Sloane et al. |
| 6,442,637 B1 | 8/2002 | Hawkins et al. |
| 6,456,334 B1 | 9/2002 | Duhault |
| 6,466,202 B1 | 10/2002 | Suso et al. |
| 6,470,378 B1 | 10/2002 | Tracton et al. |
| 6,492,997 B1 | 12/2002 | Gerba et al. |
| 6,496,802 B1 | 12/2002 | Van Zoest et al. |
| 6,522,352 B1 | 2/2003 | Strandwitz et al. |
| 6,525,762 B1 | 2/2003 | Mileski et al. |
| 6,526,034 B1 | 2/2003 | Gorsuch |
| 6,526,335 B1 | 2/2003 | Treyz et al. |
| 6,529,519 B1 | 3/2003 | Steiner et al. |
| 6,535,493 B1 | 3/2003 | Lee et al. |
| 6,542,378 B2 | 4/2003 | Jacobsen |
| 6,549,624 B1 | 4/2003 | Sandru |
| 6,560,443 B1 | 5/2003 | Vaisanen et al. |
| 6,564,070 B1 | 5/2003 | Nagamine et al. |
| 6,570,889 B1 | 5/2003 | Stirling-Gallacher et al. |
| 6,578,203 B1 | 6/2003 | Anderson, Jr. et al. |
| 6,579,203 B2 | 6/2003 | Wang et al. |
| 6,602,191 B2 | 8/2003 | Quy |
| 6,608,633 B1 | 8/2003 | Sciammarella et al. |
| 6,624,846 B1 | 9/2003 | Lassiter |
| 6,647,015 B2 | 11/2003 | Malkemes et al. |
| 6,657,654 B2 | 12/2003 | Narayanaswami |
| 6,669,346 B2 | 12/2003 | Metcalf |
| 6,675,386 B1 | 1/2004 | Hendricks et al. |
| 6,681,398 B1 | 1/2004 | Verna |
| 6,690,947 B1 | 2/2004 | Tom |
| 6,714,797 B1 | 3/2004 | Rautila |
| 6,728,518 B1 | 4/2004 | Scrivens et al. |
| 6,731,940 B1 | 5/2004 | Nagendran |
| 6,751,221 B1 | 6/2004 | Saito et al. |
| 6,754,509 B1 | 6/2004 | Khan et al. |
| 6,757,262 B1 | 6/2004 | Weisshaar et al. |
| 6,766,036 B1 | 7/2004 | Pryor |

(56) References Cited

U.S. PATENT DOCUMENTS

| | | | |
|---|---|---|---|
| 6,774,926 | B1 | 8/2004 | Ellis et al. |
| 6,782,102 | B2 | 8/2004 | Blanchard et al. |
| 6,813,608 | B1 | 11/2004 | Baranowski |
| 6,819,354 | B1 | 11/2004 | Foster et al. |
| 6,912,513 | B1 | 6/2005 | Candelore |
| 6,931,290 | B2 | 8/2005 | Forest |
| 6,934,510 | B2 | 8/2005 | Katayama |
| 6,970,183 | B1 | 11/2005 | Monroe |
| 6,986,155 | B1 | 1/2006 | Courtney et al. |
| 6,986,158 | B1 | 1/2006 | Terui et al. |
| 7,010,492 | B1 | 3/2006 | Bassett et al. |
| 7,124,425 | B1 | 10/2006 | Anderson, Jr. et al. |
| 7,149,549 | B1 | 12/2006 | Ortiz et al. |
| 7,162,532 | B2 | 1/2007 | Koehler et al. |
| 7,196,722 | B2 | 3/2007 | White et al. |
| 7,229,354 | B2 | 6/2007 | McNutt et al. |
| 7,376,388 | B2 | 5/2008 | Ortiz et al. |
| 7,379,886 | B1 | 5/2008 | Zaring et al. |
| 7,448,063 | B2 | 11/2008 | Freeman et al. |
| 7,782,363 | B2 | 8/2010 | Ortiz |
| 8,184,169 | B2 * | 5/2012 | Ortiz .......................... 348/211.8 |
| 2001/0040671 | A1 | 11/2001 | Metcalf |
| 2001/0042105 | A1 | 11/2001 | Koehler et al. |
| 2001/0045978 | A1 | 11/2001 | McConnell et al. |
| 2002/0018124 | A1 | 2/2002 | Mottur et al. |
| 2002/0058499 | A1 | 5/2002 | Ortiz |
| 2002/0069419 | A1 | 6/2002 | Raverdy et al. |
| 2002/0115454 | A1 | 8/2002 | Hardacker |
| 2002/0176000 | A1 | 11/2002 | Katayama |
| 2002/0186668 | A1 | 12/2002 | Thomason |
| 2002/0188943 | A1 | 12/2002 | Freeman et al. |
| 2003/0040303 | A1 | 2/2003 | Nelson et al. |
| 2003/0041334 | A1 | 2/2003 | Lu |
| 2003/0046108 | A1 | 3/2003 | Labadie |
| 2003/0093797 | A1 | 5/2003 | Bazzaz |
| 2003/0105845 | A1 | 6/2003 | Leermakers |
| 2005/0046698 | A1 | 3/2005 | Knight |
| 2005/0060751 | A1 | 3/2005 | Glaser |
| 2006/0170778 | A1 | 8/2006 | Ely et al. |
| 2006/0203770 | A1 | 9/2006 | Kjellberg |
| 2006/0288375 | A1 | 12/2006 | Ortiz et al. |
| 2007/0005795 | A1 | 1/2007 | Gonzalez |
| 2007/0129817 | A1 | 6/2007 | Cadiz et al. |
| 2007/0240190 | A1 | 10/2007 | Arseneau et al. |
| 2007/0275746 | A1 | 11/2007 | Bitran |
| 2009/0017749 | A1 | 1/2009 | Braun |
| 2009/0262136 | A1 | 10/2009 | Tischer et al. |

OTHER PUBLICATIONS

Aboba, B. et al. "Introduction to Accounting Management," Network Working Group, Oct. 2000, 55 pages.

Adamson, W. A., et al., "Secure Distributed Virtual Conferencing: Multicast or Bust," *CITI Technical Report 99-1*, Center for Information Technology Integration, University of Michigan, Ann Arbor, Jan. 25, 1999, pp. 1-7.

Alm, R., "New Arena a Technical Marvel," *The Dallas Morning News*, Oct. 15, 2000, pp. 1-6.

Battista, et al., "MPEG-4: A Multimedia Standard for the Third Millennium, Part 1," 1070-986X/99, *IEEE* (1999) pp. 74-83.

Bergstein, B., "Click Me Out to the Ballgame, Web-Wired Stadiums Aim to Spur Evolution of Spectator Sports," *Las Vegas Review Journal*, Online Edition, Oct. 20, 2000, pp. 1-4.

Bergstein, B., "Having a Ball with Technology, High-Tech Firms Teaming up with Pro Sports Venues," www.abcnews.com, Sep. 27, 2000, pp. 1-2.

Boyter, S., "Product likely to be home run with sports fans," *DFW TechBiz*, Aug. 21, 2000, pp. 1-3.

Braves Join the Insider Team, http://www.immersionwireless.com/atlbusinesschronicle.pdf, Apr. 1, 2002, Atlanta Business Chronicle.

Capin, et al., "Efficient Modeling of Virtual Humans in MPEG-4," 0-7803-6536-4/00, *IEEE* (2000), pp. 1-4.

Carnoy, D., "LG TP3000," *CNET Wireless*, Aug. 17, 2000, pp. 1-2.

Carroll, K., "Fans take to ChoiceSeats: Interactive technology, e-commerce expand to sporting events," *Telephony Online*, Jan. 10, 2000, 2 pgs.

"ChorceSeat, Live Interactive Event Entertainment," www.choiceseat.com, Oct. 15, 2000 pp. 1-5.

"ChoiceSeat The Interactive Evolution of Sports," Sponsorship Opportunities, n.d. (2 pages).

CNET, Shakeware, http://download.cnet.com/MP3-Player-2000/3000-2133_4-10040702.htm (Feb. 28, 2000).

CNET, "Cell phone video start-up files for IPO" http://news.cnet.com/Cell-phone-video-start-up-files-for-IPO/2100-1033_3-238076.html (Mar. 16, 2000).

"Contactless Applications for PDAs"; Inside Technologies, Cartes 2000, Aug. 2000, pp. 1-14.

Gordon, K., "Interactive Broadband Video at the Garden," *Digital Video Magazine* Apr. 2000, 11 pages.

Gussow, D., "Sittin' in the captain's chair," *St. Petersburg Times* Mar. 30, 1998, 4 pages.

"Fiber Optic Video/Audio/Intercom/Data System," Telecast Fiber Systems, Inc., pp. 1-4.

Hibbert, L., "Decision you can't argue with," *Professional Engineering* Jul. 7, 1999, 12(13):26-27.

Higgins, Region Focus, Virtual Vroom! http://www.immersionwireless.com/regionfocus.pdf, created Aug. 23, 2005.

IEEE Computer Society, "IEEE Standard Glossary of Computer Networking Terminology," Jun. 30, 1995 (7pages).

"IEEE 802.11b Wireless LANs," 3COM Technical Paper, Apr. 25, 2000, pp. 1-3, pp. 1-13.

International Telecommunication Union, "Data Networks and Open System Communications Open Systems Interconnection—Model and Notation ITU-T Recommendation X.200," Jul. 1994 (63 pages).

Lauterbach, T., et al., "Multimedia Environment for Mobiles (MEMO)—Interactive Multimedia Services to Portable and Mobile Terminals," Robert Bosch Multimedia-Systems GmbH & Co., KG., Hildesheim, Germany, 1997, pp. 1-6.

"Microsoft Windows Embedded, CE Product information," Microsoft.com, Feb. 6, 2001 (3 pages).

"Peanuts, popcorn and a PC at the old ballpark," www.king5.com, Sep. 28, 2000, pp. 1-4.

Rigney, C. et al. "remote Authentication Dial in User Service (RADIUS)" Network Working Group, Apr. 1997, 66 pages.

Ruel, VYVX, Doctor Design, and Erbes Dev. Group Go to the Ball Game: Watch PC-TV, Internet TV at the Stadium http://ruel.net/top/box.article.05.htm (Sep. 1, 1997).

Rysavy Research, "Strategic Use of Wi-Fi in Mobile Broadband Networks," Oct. 14, 2010 (13 pages).

Salzberg, K. et al., "Intel's Immersive Sports Vision," Intel Corporation, Mar. 30, 2001.

Sanborn, S., "Armchair Quarterbacks go Wireless at 3Com Park," *InfoWorld*, Sep. 29, 2000, pp. 1-2.

"Scanz Communications Forms Joint Venture with Screenco Pty Ltd.," Business Wire, Oct. 25, 2000 (1 page).

"Scanz Communications and Star Bridge Systems Announce Strategic Alliance," Business Wire, Oct. 21, 1999 (2 pages).

Scanz Communications, Press Excerpts, http://www.designadvocate.net/scanz/news.html, printed Nov. 13, 2011.

Schmuckler, E., "Best Seat in the House?" *Brandweek* Oct. 16, 2000, 41(40):48, 5 pages.

Screenshot of www.scanz.com as of Jun. 2, 2000 (2 pages).

Screenshot of www.scanz.com/Consumer_Product.htm as of Jun. 2, 2000 (2 pages).

"Seeing is Believing—Motorola and Packetvideo Demonstrate MPEG-4 Video over GPRS," Press Release, Packetvideo, May 10, 2000, pp. 1-3.

"SGI at the Pepsi Center"; Silicon Graphics, Inc.; Jul. 2000, pp. 1-2.

Traffic411.com Joins Packet Video in Wireless Multimedia Trials http://www.traffic411.com/pressbody.html#06-13-00 (Jun. 13, 2000).

Trask, N. T. et al., "Smart Cards in Electronic Commerce," *BT Technol J.*, (1999) 17(3):57-66, July.

Unstrung: The Birth of the Wireless Internet, CIBC World Markets, Equity Research, Oct. 4, 2000, pp. 1-140.

(56) References Cited

OTHER PUBLICATIONS

Walters, Sports Illustrated Asia, Instant Gratification, http://sportsillustrated.asia/vault/article/magazine/MAG1017633/index/htm. Nov. 15, 1999, Asia.

Williams, P., "No choice: Stats, highlights available in wireless world," *Street & Smith's Sports Business Journal* Apr. 8, 2002 (2 pages).

"Wireless Dimensions Corporation Adds to Mobile-Venue Suite™"; Press Release, Wireless Dimensions; Allen, Texas; Jul. 26, 2000; http://www.wirelessdimensions.net/news.html, pp. 1-2.

"Wirelss Dimensions Corporation Unveils Mobile-Venue Suite™"; Press Release, Wireless Dimensions; Allen, Texas; Jun. 19, 2000; http://www.wirelessdimensions.net/news.html, pp. 2-3.

Wolfe, A. et al., "Handhelds, downsized PCs, smart phones converge on Comdex—Info appliances go prime time," *Electronic Engineering Times* Nov. 15, 1999 (3 pages).

Wu, et al., "On End-to-End Architecture for Transporting MPEG-4 Video over the Internet," *IEEE Transactions on Circuits and Systems for Video Technology* (2000) 10(6):1-18, Sept.

U.S. Appl. No. 95/001,565, filed Mar. 4, 2011, Ortiz et al.
U.S. Appl. No. 95/001,566, filed Mar. 4, 2011, Ortiz et al.
U.S. Appl. No. 95/001,567, filed Mar. 7, 2011, Ortiz et al.
U.S. Appl. No. 95/001,568, filed Mar. 7, 2011, Ortiz et al.
U.S. Appl. No. 95/002,393, filed Sep. 15, 2012, Ortiz et al.

IEEE Computer Society, IEEE Std 802.11a-1999(R2003), "Part 11: Wireless LAN Medium Access Control (MAC) and Physical Layer (PHY) specifications. High-speed Physical Layer in the 5 GHz Band." (91 pages).

IEEE Computer Society, IEEE Std 802.11b-1999(R2003), "Part 11: Wireless LAN Medium Access Control (MAC) and Physical Layer (PHY) specifications: Higher-speed Physical Layer Extension in the 2.4 GHz band." 2000 (96 pages).

U.S. Appl. No. 95/001,566, Mar. 4, 2011, Ortiz et al.
U.S. Appl. No. 95/001,567, Mar. 7, 2001, Ortiz et al.
U.S. Appl. No. 95/001,568, Mar. 7, 2011, Ortiz et al.
U.S. Appl. No. 95/002,393, Sep. 15, 2012, Ortiz et al.

* cited by examiner

PROVIDING MULTIPLE VIDEO PERSPECTIVES OF ACTIVITIES THROUGH A DATA NETWORK TO A REMOTE MULTIMEDIA SERVER FOR SELECTIVE DISPLAY BY REMOTE VIEWING AUDIENCES

CROSS-REFERENCE TO RELATED APPLICATIONS AND PRIORITY

The present application is continuation of U.S. patent application Ser. No. 12/844,122, which was filed on Jul. 27, 2010 now U.S. Pat. No. 8,184,169, and which is incorporated herein by reference in its entirety. U.S. patent application Ser. No. 12/844,122 in turn is a continuation of U.S. patent application Ser. No. 12/210,971, entitled "Providing Multiple Video Perspectives of Activities Through A Data Network to a Remote Multimedia Server for Selective Display by Remote Viewing Audiences," which was filed on Sep. 15, 2008 now U.S. Pat. No. 7,782,263, the disclosure of which is incorporated herein by reference in its entirety.

U.S. patent application Ser. No. 12/210,971 is a continuation-in-part of U.S. patent application Ser. No. 10/620,098 entitled "Providing Multiple Synchronized Camera Views for Broadcast From a Live Venue Activity to Remote Viewers" filed on Jul. 14, 2003 now U.S. Pat. No. 7,796,162, which is a continuation-in-part of U.S. patent application Ser. No. 09/708,776, entitled "Providing Multiple Perspectives for a Venue Activity Through an Electronic Hand Held Device," filed Nov. 8, 2000, now U.S. Pat. No. 7,149,549, which was a non-provisional of a provisional patent application, Ser. No. 60/243,561, entitled "Providing Multiple Perspectives for a Venue Activity Through an Electronic Hand Held Device," filed Oct. 26, 2000.

U.S. patent application Ser. No. 12/210,971 is also a continuation-in-part of U.S. patent application Ser. No. 09/902,348, entitled "Providing Multiple Perspectives of a Venue Activity to Electronic Wireless Hand Held Devices," and filed on Jul. 10, 2001 now U.S. Pat. No. 7,812,856, which was a non-provisional of a provisional patent application, Ser. No. 60/243,561, entitled "Providing Multiple Perspectives for a Venue Activity through an Electronic Hand Held Device," filed on Oct. 26, 2000.

U.S. patent application Ser. No. 12/210,971 is also a continuation-in-part of U.S. patent application Ser. No. 10/015,458 entitled "Wireless Transmission of In Play Camera Views to Hand Held Devices" filed on Dec. 13, 2001.

U.S. patent application Ser. No. 12/210,971 is also a continuation-in-part of U.S. patent application Ser. No. 11/864,052, entitled "Processing of entertainment venue-based data utilizing wireless hand held devices," filed Sep. 28, 2007, which is a continuation of U.S. patent application Ser. No. 11/498,415 entitled "Broadcasting Venue Data to a Wireless Hand Held Device," filed on Aug. 2, 2006 now U.S. Pat. No. 7,376,388, which is also continuation of U.S. patent application Ser. No. 09/708,776 entitled "Providing Multiple Perspectives for a Venue Activity Through an Electronic Hand Held Device" filed Nov. 8, 2000 now U.S. Pat. No. 7,149,549, and which claims the benefit of U.S. Provisional Application Ser. No. 60/243,561, which was filed on Oct. 26, 2000, and which also a continuation of U.S. patent application Ser. No. 09/887,492, entitled "Systems, Methods and Apparatuses for Brokering Data Between Wireless Devices and Data Rendering Devices," which was filed on Jun. 22, 2001 now U.S. Pat. No. 7,630,721, and which claims priority as a continuation to U.S. Provisional Patent Application, Ser. No. 60/214,339, entitled "Systems, Methods and Apparatuses for Brokering Data Between Wireless Devices and Data Rendering Devices," which was filed on Jun. 27, 2000. The specifications of the aforementioned U.S. patent application Ser. Nos. 10/620,098, 09/708,776, 09/902,348, 10/015,458, 11/863,052, 09/887,492, 60/243,561, and 60/214,339 are herein incorporated herein in their entirety by reference.

U.S. patent application Ser. No. 12/210,971 is also related to issued U.S. Pat. No. 7,376,388, also incorporated herein by reference in its entirety for its teaching.

TECHNICAL FIELD

Embodiments are related to video-enabled data-processing devices and systems. Embodiments also relate to techniques for providing increased viewing opportunities for video and photographic perspectives of activities that can occur during their recording privately or at public entertainment venues and community environments, such as sports stadiums, arenas, convention centers, concert halls, political convention, trade shows, Olympic events, and the like. Embodiments additionally relate to techniques for transmitting video-related data captured by cameras located near an activity over a data network to a server. Servers can be located at or away from a recorded activity. More particularly, embodiments are also related to a system capable of processing video-related data including multiple visual perspectives or vantage points captured by multiple cameras located at or near the activity and stored in a remote multimedia server for selective display of visual perspectives at a variety of user video display devices (e.g., digital televisions, set-top boxes, computers, wireless handheld devices) in wired or wireless communication with multimedia servers and service providers.

BACKGROUND OF THE INVENTION

Most modern sports stadiums and live entertainment facilities, convention centers, halls or arenas and the like (herein also collectively referred to as "entertainment venues") employ cameras positioned to capture video images at diverse locations within the stadium. The audience at a typical sporting event, for example, can generally view advertisements, instant replays, and other sports related data on the large television screens within the sports stadium itself. Audiences viewing sporting events remotely (e.g., from their homes) can also view video, instant replays, advertisements and other sports related data; however, video feeds that are broadcasted remotely through satellite and cable television networks or displayed at the venue are limited to a single aspects provided for broadcast to remote displays one at a time from venue controlled media or broadcast media directors. Media directors, normally located in a broadcast room/booth, have access to several perspectives of an activity captured by cameras located at the entertainment venue simultaneously and can cause the real time play and replay of various aspects of the action at the event while also enabling commentators to provide comments about what is being displayed. Video feeds are typically transmitted/broadcasted under licensing arrangements with broadcasting entities for viewing by a remote viewing audience.

Fans/spectators of an entertainment venue activity have been limited in the past over what video perspectives they can view because video broadcasted from or shown at a venue because perspectives are pre-selected by media directors and broadcasters for the remote viewing audience. The remote viewing audience can utilize television sets to view broadcasted video transmitted through cable television, satellite and radio frequency (RF) transmissions. Computers can also be used to view streaming video data transmitted over data networks. Despite the availability of remote resources for the remote viewing audience user to view video captured by cameras at entertainment venues, the user is still currently restricted to viewing a single pre-selected (or released) video. Furthermore, video perspectives are limited by the amount and placement of cameras located within the entertainment venue and controlled by entertainment venue operators and licensees. Even in situation where multiple perspectives of an activity are recorded, images recorded from various perspectives are not synchronized to a particular time period and location. What are needed are more video viewing options for remote viewing audiences where multiple perspectives of an activity are available as recordings. What is also needed are video media viewing options that enable remote viewing audiences to view multiple perspectives of an activity from the same point in time and at different angles with respect to the activity.

It is therefore desirable given the present invention that remote viewing audiences be provided enhanced viewing options in the form of multiple viewing perspectives captured by cameras within the entertainment venue as well as any other activity, public or private, wherein cameras may be utilized to capture video. The present inventor believes that additional video perspectives provided in the form of new video viewing options captured at entertainment venues and of other activities not necessarily tied to an official sports venue can be provided to remote viewing audiences over current data networks (wired and wireless) for display at various user devices (e.g., computers, High Definition Televisions (HDTVs), set-top boxes such as TiVO™ devices and those provided by cable and satellite companies like Comcast™, DirecTV™ and Dish Network™, and handheld devices, such as Palm™, Blackberry™ and iPhone™ PDAs, other data/video-enabled cellular telephones, and other hand held wireless video-enabled devices such as Apple iTouchT™, Nintendo DS™ and Sony Playstation™ (PSP) devices), iPhone™ and iTouch™ are registered trademarks of Apple Inc., Blackberry™ is a trademark of Research In Motion Ltd., Palm™ is a trademark of Palm Inc., TiVO™ is a trademark of TiVo Inc., DIRECTV™ is a trademark of DIRECTV Inc., Dish Network is a trademark of EchoStar Communications Corporation, Nintendo DS™ is a trademark of Nintendo of America Inc., and Sony PSP™ is a trademark of Sony Corporation Entertainment America Inc.

Much of what is needed to teach aspect of the present invention has already been described in the patent applications that are incorporated herein by reference with priority extending back to the years 2001 and 2000. Since then, video sharing websites and online communities have come into being such as YouTube.com™, MySpace.com™, Flickr™, Fancast™ and MyFrontRow.com™ for basic video and picture sharing, and Second Life™ (abbreviated SL), for more engaged interaction by community members virtually using avatars. YouTube is a trademark of Google Inc., MySpace™ is a trademark of MySpace Inc., Flickr™ is a trademark of Yahoo Inc., Facebook™ is a trademark of Facebook Inc., Fancast™ is a trademark of Comcast Corporation, MyFrontRow™ is a trademark of Front Row Technologies, LLC, and Second Life™ is a trademark of Linden Research Inc. The number on online communities with video and picture sharing capabilities continues to grow; but there is still much room for improvement in the delivery of media to end users such as those that are members of an online community, or to remote spectators watching high definition television through cable and satellite broadcasting services. Enhanced video and picture management and retrieval where multiple perspectives of the same activity when available will provide a higher level of service value to end users of current online multimedia services and resources and is what is still needed in online communities as they continue to develop. Enhanced video and picture capturing, sharing, searching and viewing capabilities for multimedia content providers, enablers and broadcasters will now be possible with the reaching of the present invention.

Handheld computing devices (i.e., also referred to as "hand held devices" or "wireless handheld devices") have become increasingly popular over the past decade for storing and maintaining information. Many handheld devices include video recording capabilities and can communicate with available wired and wireless data communications networks including the Internet via wireless communication transceiver links to data communications networks (e.g., cellular data networks that are 3G enabled). Handheld devices that are capable of displaying and recording video and can communicate wirelessly with data networks were also taught in the prior patent applications for which the present application claims priority.

The present inventor further believes that viewing audiences can also be provided enhanced access to captured video content through servers where the data is identified for access from the multimedia servers based on title, location, date, and other related data. A geotag or geostamp is a sequence of characters that can be associated with data to denote a time and location at which a certain event occurred. A geotag can typically include information about latitude, longitude, time, and elevation, Data can be taken from Global Position Satellites (GPS). Although tags with geographical information can be used in association with captured video and pictures, current wireless handheld devices with integrated cameras, GPS and wireless data communications capabilities are not adapted to automatically tag pictures as they are taken. Geographical tagging without automation (and possible standardization) is simply not convenient for most users because tagging requires too much time or steps using available software and hardware to determine and associate with captured video and picture data.

The present inventor believes that wireless GPS-enabled handheld devices that include video cameras, video recording capabilities and wireless data communications can be utilized to provide video and still pictures with geographical information, automatically. It would also be more desirable and acceptable for general use if video and pictures could automatically be tagged with location, time and date information so that subsequent retrieval from a server can be facilitated based on a location, date and time of interest. It would also be desirable if users accessing servers containing tagged video and pictures could retrieve video and picture related data based on membership or access to a particular community, or to be able to search a point in time and location of interest. For example, a user may want to search for content from a specific GPS location and within a specific distance from the GPS location, at a specific date and within a particular point of or span in time. Such a capability would be of high value and very useful for entertainment, business and national security purposes, The present invention enables many new capabilities for video related media to address a broad spectrum of applications and the needs of end users. The present invention provides enhancements over spectator access to video and picture related data accessible via servers, online services and communities, and over a data communications and broadcast networks and end user multimedia hardware.

BRIEF SUMMARY

One aspect of the present invention provides improved methods and systems for delivering activity-related video data and pictures to a multimedia server for access by remote video display devices having access to the multimedia server.

It is another aspect of the present invention to provide improved methods and systems for delivering video captured from different visual perspectives of an activity, such as private activities as well as public activities including those occurring in an entertainment venue, to a server for processing and access by remote display devices.

It is still another aspect of the present invention to provide methods and systems for providing multiple visual perspectives from an activity for viewing through remote display devices.

It is yet another aspect of the present invention to provide systems and associated methods that provide on-demand video action and instant replays from multiple camera angles captured from venue and/or private user cameras focused on the activity.

It is yet another aspect of the present invention that venue and/or private user handheld devices with cameras that are focused on the activity can capture video including identifying data such as electronic tag bearing the date, time and location information where the video (or pictures) were captured (e.g., GPS location and time stamped where time stamping can be provided from GPS-UTC or from Atomic dock time).

It is another aspect of the present invention to provide wireless handheld devices with wireless data network communications, a video camera, GPS and software enabling automatic geographic location and time tagging for recorded media.

It is yet another aspect of the present invention that enables users to access a multimedia server and access video and photos captured of an activity and including identifying data such as electronic tag bearing the date, time and location information where the video (or pictures) were captured (e.g., GPS and time stamped) and also enables the users to search for video and/or photos of an activity based on time, date, location, title, category, and also enable the limiting of distance from the location of interest and timeframe for which data should be retrieved when location information is provided with the data.

It is yet another aspect of the present invention that enables users to access video of an activity in multiple visual perspectives from a multimedia server and simultaneously play/replay the multiple visual perspectives of video in synchronicity based on data tagging embedded in video data.

According to unique features of the present invention, systems and methods provide increased remote video viewing opportunities of activities, private and public, including activities that occur at entertainment venues. Video-related data including multiple visual perspectives captured by cameras located at or near the activity can be transmitted over wired/wireless data networks to a server where video-related data is processed and recorded for selective display by authorized, remote video display devices (e.g., HDTV, set-top boxes, computers, and wireless handheld devices) also in wired/wireless communication with the server. Users and online communities can be registered with multimedia servers or a service and users can be authorized to access a server to provide video captured at an activity. Single user registration or registration in association/membership with a community is enabled. Video can be captured by users using a camera included in a wireless handheld device. Registered user can selectively retrieve video-related data captured at the activity for display by video display devices. Captured video can be organized in servers based on at least one of: activity title, activity time, activity date, activity place, GPS location of wireless handheld device at time of video recording.

A server can be provided that is adapted to: receive different visual perspectives of a public activity captured by more than one camera located at the activity, process the different visual perspectives into video-related data and record the video-related data for selective retrieval and display by user video display devices authorized to communicate with the remote server over a data network.

A registration module can be provided that is adapted to register users and authorize user access to the server to: provide video captured at the activity using a camera included in a wireless handheld device and selectively retrieve video-related data captured at the activity for display by a user video display device.

An activity organization module can be provided that is adapted to organize video captured by a user at the activity using a camera included in a wireless handheld device and provided to the server, wherein the video is automatically organized by the server based on identifying data including at least one of: activity title, activity time, activity date, activity place, GPS position of wireless handheld device at time of video recording, and the activity organization module can be further adapted to provide a user selective access to the organized video from the server based on a request from the user of at least one of: activity title, activity time, activity date, activity place, wireless handheld device GPS position at time of video recording. GPS information typically includes the latitude, longitude, and time (e.g., UTC or Atomic dock time). The time, date and location can be specified when provided as part of the search criteria for media (e.g., GPS Lat xx.xx.xx and Long xx.xx,xx within a 0.5 mile radius, from 1700 hrs to 1730 hrs). Proper "time" identification tagging of video when/as recorded is important where synchronization of multiple perspectives for accurate viewing simultaneously on displays associated with video display devices is desired. Accurate timing can be provided by GPS-based UTC time and also by Atomic Clock time to ensure that video of an activity recorded by/from disparate sources can be synchronized when played or replayed on remote video systems.

A community association module can be provided that is adapted to associate registered users with online communities also registered within the server and to provide a user with selective access to organized video of activity captured by a cameras used by community members of an activity and provided to a server, wherein the video is provided to the user from the server based on a request from the user of at least one of: activity title, activity time, activity date, activity place, wireless handheld device location (e.g., GPS) at time of video recording, and distance from a location of interest.

A method providing increased remote video viewing opportunities of activities including those public and private that occur at entertainment venues to a remote audience can include the step of registering users and online communities at a server adapted to receive and process video and authorizing the users associated with online communities to access said server adapted to receive and process video to provide video captured at the activity using a camera included in a wireless handheld device and to selectively retrieve video-related data captured at the activity for display by video display devices.

A method step can be provided for receiving different visual perspectives of an activity captured as video by more than one camera located at an activity at a server adapted to receive and process video, wherein the different visual perspectives are received at the server adapted to receive and process video through a data network.

A method step can be provided for processing the different visual perspectives at the server adapted to receive and process video into video-enabled data and recording the video-enabled data in a memory (e.g., database) associated with the server adapted to receive and process video.

A method step can be provided for organizing video captured by a user at the activity using a camera included in a wireless handheld device and provided to the server adapted to receive and process video based on identifying data including at least one of: online community name, activity title, activity time, activity date, activity place, wireless handheld device GPS position at time of video recording.

A method step can be provided for providing user access to the organized video from the server adapted to receive and process video based on a request from the user of at least one of: activity title, activity time, activity date, activity place, wireless handheld device GPS position at time of video recording, The video-related data is provided to the video display devices from a server adapted to receive and process video over a data network. Again, it is a feature of the present invention that the time, date and location of an event capture can be specified when provided as part of the search criteria for recorded media (e.g., GPS lat xxxxxx and long xxxxxx within a 0.5 mile radius, from 1700 hrs to 1730 hrs, on Dec. 31, 2008). Again, accurate timing recorded on the media, e.g., if provided by GPS-based UTC time and also by Atomic Clock time, can ensure that video of an activity recorded by/from disparate sources can be synchronized when played or replayed on remote video systems; especially when multiple perspectives are played on a display simultaneously over split screen views provided in a video display.

Yet another method step can be provided that enables accessed video of an activity in multiple visual perspectives from a multimedia server to be simultaneously play/replay in synchronicity on a video display based on data tagging embedded in video data.

The above and other aspects of the invention are achievable as will now be further described.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION

Figure 1:
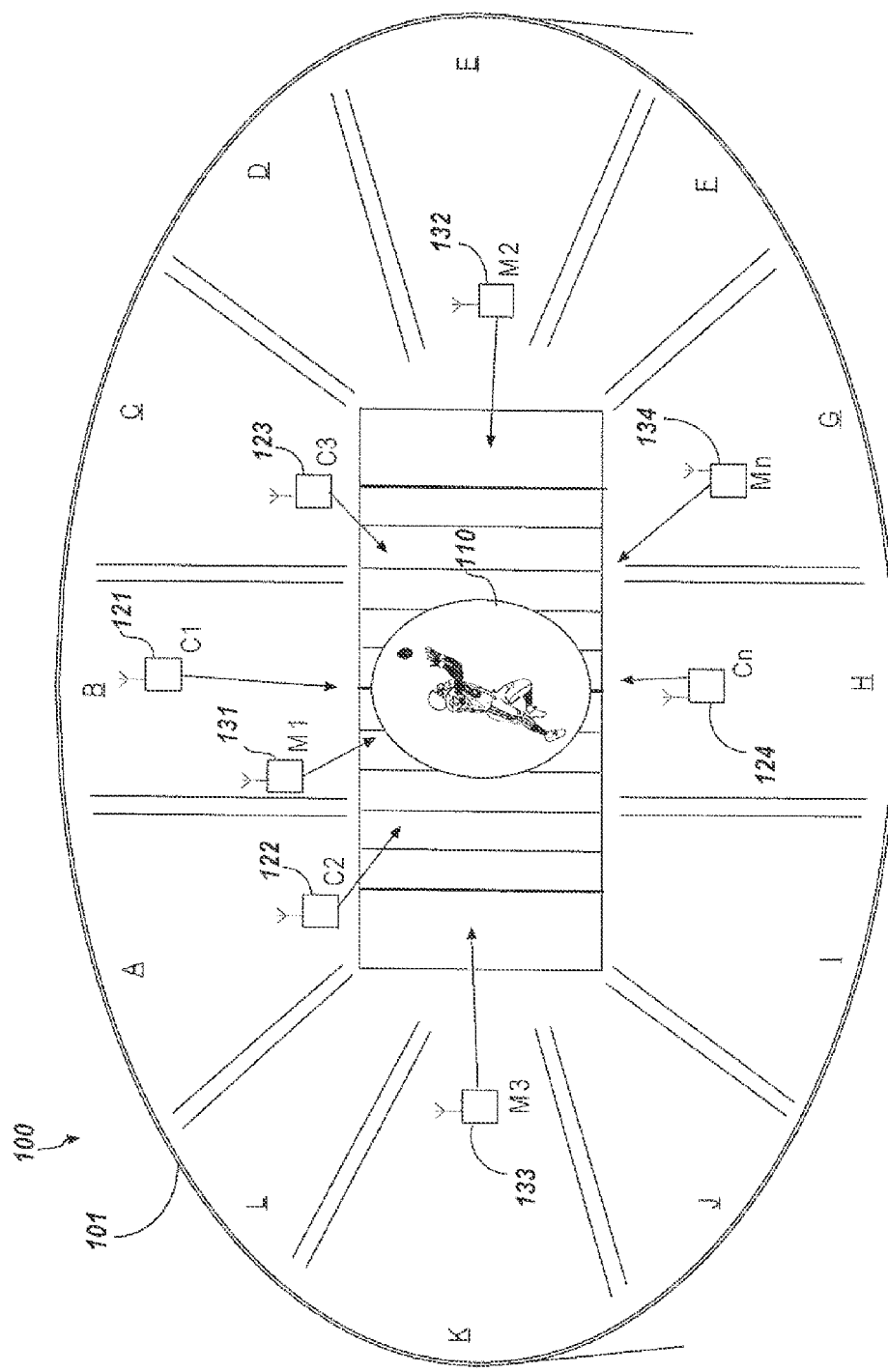
FIG. 1 depicts a diagram wherein several cameras are recording various perspectives of an activity at a venue.

Referring to FIG. 1, illustrated is an example of an entertainment venue 100, such as a football stadium. An entertainment venue typically includes a public attendee seating area 101, which is typically divided according to seats and sections, surrounding an activity area 110, which is typically reserved for access by authorized personnel and performers/athletes, The seating area 101 surrounding the activity area 110 and can be divided into sections, e.g., sections A through N is shown. Several venue controlled video cameras C1-Cn can be deployed throughout the entertainment venue 100 and can typically surround the activity area 110 to provide multiple vantage points from which to capture video for broadcast and display of the activity taking place in the entertainment venue. In addition to entertainment venue controlled cameras C1-Cn, many private handheld devices enabled with video cameras M1-Mn and owned/carried by attendees (e.g., spectators and fans) can be located throughout the entertainment venue. An entertainment venue 100 can be utilized for sports activities, concert activities, political rallies, or other activities requiring a large space. Entertainment venue controlled cameras C1-Cn together with private handheld cameras M1-Mn provide an opportunity for vast coverage of the activity area 110.

FIG. 1 illustrates how effectively an entertainment area 110 can be covered by various video cameras capturing video and/or pictures of an activity. Entertainment venue controlled camera one (C1) 121 is shown located near the center field location of the venue providing a central venue of the activity area 110 Entertainment venue controlled cameras two (C2) 122 and three (C3) 123 are shown located at opposite end zone locations of the activity area 110. Entertainment venue controlled camera n (Cn) 124 is shown at the opposite side of the activity area 110 in Section H. The entertainment venue controlled cameras C1-On can obviously provide good visual coverage of the activity area; but it can be appreciated that attendee handheld devices equipped with video recording capabilities are mobile and can also be deployed in several areas through the public attendee area 101, thereby providing an even richer selection of video perspectives for fans that might be observing the activity, or may be located at home or any other remote location outside of the venue proper.

Attendee handheld device one (M1) 131 is shown located in Section A with a slightly different vantage point that entertainment venue controlled camera one (C1) 121. Attendee handheld device one (M1) 131 clearly compliments the perspective captured by entertainment venue controlled camera one (C1) 121 from Section A. Attendee handheld devices two (M2) 132 and three (M3) 133 are located at centralized end zone locations (Sections E and K respectively). Attendee handheld devices two and three clearly provide views that were not covered by the entertainment venue controlled cameras. Another attendee handheld device (Mn) 134 is shown located in Section G, providing yet another perspective for activity fans.

The deployment of multiple cameras as shown for the entertainment venue illustrated in FIG. 1 offers unique multimedia content, which can be of value to all spectators. Although an entertainment venue 100 is shown in FIG. 1, it should be appreciated that an "activity" does not have to take place within a public "entertainment" venue to be recorded by video cameras. Indeed, activities of interest can also take place at private or public events and locations that do not draw large scale attendance but are nevertheless of high interest. For example, a little league baseball game might be recorded by several parents attending the game. A competition that is distributed over a vast area, such as a bike or auto race, can be captured from various, distributed perspectives. Views captured by private attendees at such events are of value to all attendees and can be shared by using a multimedia server in accordance with features of the present invention. Camera views can be captured by more than camera deployed about and/or in surrounding a live sports or entertainment venue activity 110, such as a racing event, ball game, concert, golf, Olympic event, political rally, boxing or wresting ring, and casino activities such as sports book. The activity does not have to be entertainment based to be of value and can be stored in a server by individuals working alone or as a member of an organized community/group. Proper "time" identification tagging of video when/as recorded is important where synchronization of multiple perspectives for accurate viewing simultaneously on displays associated with video display devices is desired. Accurate timing can be provided by GPS-based UTC time and also by Atomic Clock time to ensure that video of an activity recorded by/from disparate sources can be synchronized when played or replayed on remote video systems.

An activity can also be of educational, commercial or government interest. For example, if a natural disaster or terrorist act occurred where several witnesses were able to record the event with personal handheld video cameras, the video images may be of very high value from a national security or investigation standpoint and can be shared via a multimedia server adapted to collect and organize various videos. The Department of Homeland Security (DHS) and government investigative and intelligence agencies, for example, would be interested in collecting as much information about an unfortunate, public event as possible in order to find those responsible, or to prevent future occurrences. A Hollywood scenario in the 2008 movie release "Vantage Point" is a fictitious action movie that provides moviegoers a scenario where an attempted assassination of the president is told from five different points of view. Although fictitious, the scenario revealed in this movie is a good example where video data in synchronicity from different vantage points from a real-world situation can become highly valuable and necessary for investigative purposes. As another example, a casino operator can also be very interested in monitoring various perspectives within the casino for security purposes. Fulfillment of these needs and other application can be envisaged now given the present invention.

Referring again to the illustration in FIG. 1, assuming that the venue 101 is instead a town or a city, the activity 110 of interest may be observed by spectators at various locations surrounding the activity. If witnesses to an activity also have the means to capture video or photographs of the activity and could upload the captured data into a server where the date, time and location for the data is also identified, then researchers or investigators can easily find important, high value information about the activity from servers. Again, proper "time" identification tagging of video when/as recorded is important where synchronization of multiple perspectives for accurate viewing simultaneously on displays associated with video display devices is desired. Accurate timing can be provided by GPS-based UTC time and also by Atomic Clock time to ensure that video of an activity recorded by/from disparate sources can be synchronized when played or replayed on remote video systems. GPS tagging, which will be described in more detail below, can actually provide date, time and location with great accuracy and may be best suited for providing this information on media.

Those sidled in the art can appreciate that hand held devices can be implemented as a Internet-enabled cellular communications device, such as a Blackberry™, iPhone, and Palm Treo™ Smart phones and PDA devices sold today include high-speed data network access (e.g., HSPA-HSDPA, WiMAX, Edge, GSM, etc.), providing video streaming, provide Internet access, and can capture video with greater than 1 megapixel image capturing capability. Global position system (GPS) chipsets are also provided on handheld devices today. Handheld devices such as PDAs and Smart Phones have been thoroughly described in the patent applications which are incorporated by reference with priority. Furthermore, those skilled in the art are currently well informed about most of the features and operation of handheld devices. For these reasons, additional detail is not required for a generally understanding of wireless handheld devices as they are used with or to carry out the unique features of the present invention.

To the extent the provision of wireless handheld devices with wireless data network communications, GPS and video recording camera can be improved to best operate in accordance with features of the present invention, a software module can be provided as part of the multimedia features in a handheld device that can automatically include a data tag on the recorded media that can indicate the location and time of video or picture recording. For example, a time and location sentence can be embedded in the digital file or as a message embedded in pixilated media that will provide the time and location of the recorded activity. A data tag sentence that will indicate that a photograph or video was captured on Dec. 31, 2008 at UTC time 12:35:19 and at GPS location Latitude 48 deg 07.038' N; Longitude 11 deg 31.000' E can be provided in a simplified format that can read as follows: 12312008, 123519,4807.038,N,01131.000,E. An abbreviated data tag can be easily searched for in searchable databases within a server. The server and/or data base can be programmed to convert the data tag into searchable media where a user of a multimedia service may request that video/pictures be found from a within one half mile of a specification GPS location within a range of time by entering indentifying information into search field over a graphical user interface (GUI). An example search can include the following: Search within Distance=0.5 mile(s) of GPS Location=Latitude 48 deg 07.038' N and Longitude 11 deg 31.000' E ; at Time=1700 hrs to 1730 hrs; Date=Dec. 31, 2008). Access to recorded media, therefore, can be provided to users from the server based on search criteria specific to the timeframe, date and location of the data's capture as described above. For example, a researcher can request from the multimedia server that video and pictures of an activity taking place at a specific location, at a specific date, during a given timeframe as receive only media that is relevant to the exact activity of interest (e.g., winning touchdown, questionable call by a referee, a spectacular public sighting, a catastrophic event, and event of political, educational and investigative interest).

As described above, if wireless handheld devices have GPS capability and integrated video cameras, software programming can be incorporated as a companion application with multimedia software used to capture/record video and photographs to enabling the tagging of any media captured by the video camera (video or pictures) to include an associated data stamp that includes, the date, time, and GPS location for the captured video or picture data as it is actually recorded. It can even be possible to include the direction in degrees (e.g., using an electronic compass) and altitude of the handheld device when the video/pictures were actually captured by the camera. Additional data can be entered into the server when video/photos are uploaded, such as title, location or event names, etc. Users can later access the multimedia data, now organized as video or pictures from a server with at least one of: activity title, activity time, activity date, activity place, wireless handheld device GPS position at time of video recording, altitude at capture, orientation or direction of capture by handheld during capture (i.e., provided in degrees from magnetic north an electronic compass integrated in the camera/handheld device).

It is appreciated that privacy may come into play with certain technology. The idea of automatically tagging video or photographs when they are captured by cameras may not settle well with some users. For this reason, Handheld devices can also be programmed to enable the user/owner of the cameras to disable or suppress tagging for photograph if location information is not desired. This may be an important privacy feature depending on the sensitivity of the multimedia content being recorded by the camera. The software module can allow GPS to be overriding by depressing a button, softbutton or set up parameter before taking video footage with the handheld device.

Figure 2:
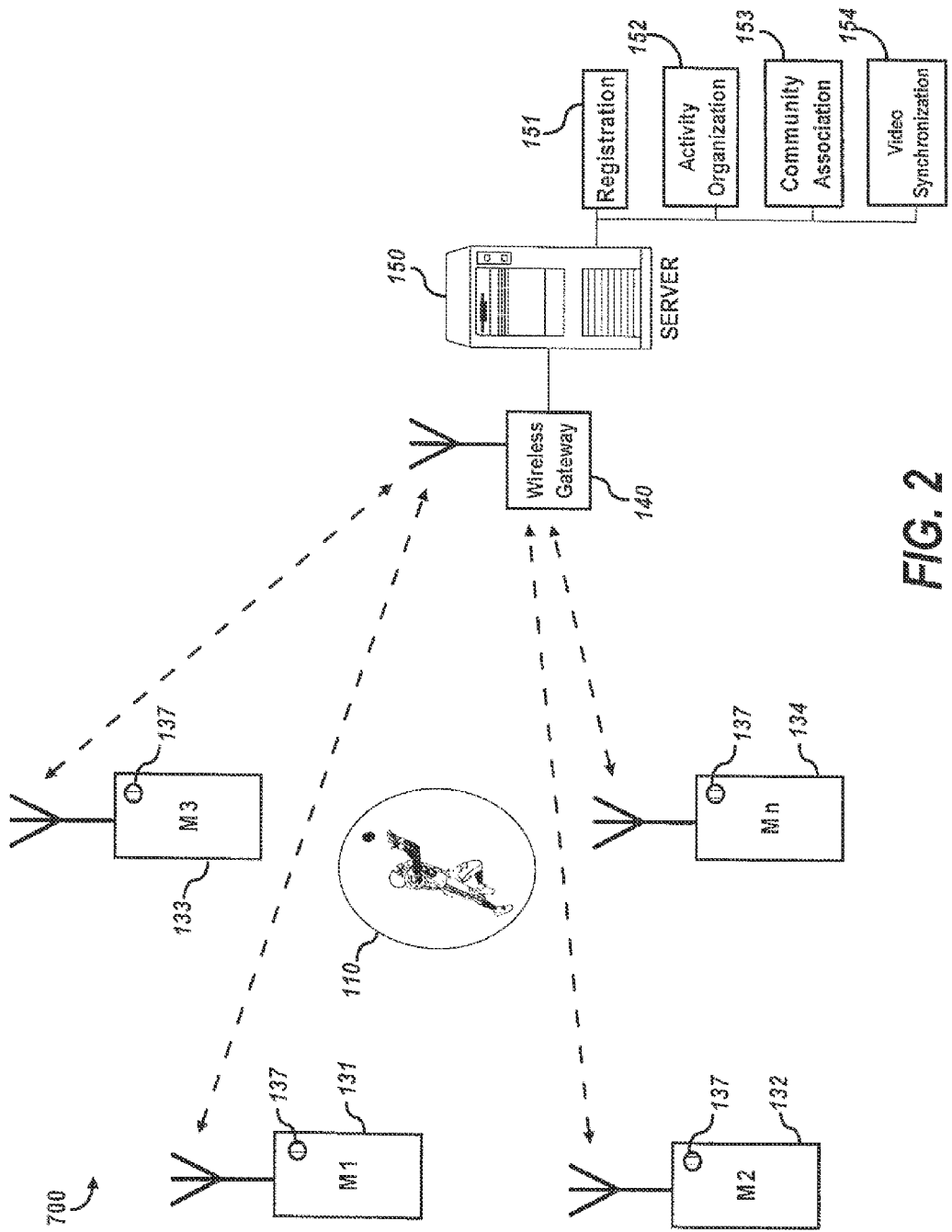
FIG. 2 illustrates a block diagram of camera-enabled handheld devices recording video of an activity from different perspectives for transmission through a wireless gateway for storage at a multimedia server.

Referring to FIG. 2, a block diagram of camera-enabled handheld devices 131-134 including integrated video cameras 137 for recording video of an activity 110 for transmission through a wireless gateway 140 for storage at a server 150 is illustrated. In accordance with a feature of the present invention, a server 150 can be provided that is capable of receiving different visual perspectives of a activity 110 captured by more than one camera 131-134 located at, near and/or around the activity 110. The server 150 can process the different visual perspectives of the activity 110 into video-related data and record the video-related data for selective retrieval and display by user video display devices authorized to communicate with the server 150 over data networks.

A registration module 151 can be provided with the server 150 that is adapted to register users and authorize user access to the server to: provide video captured at the activity 110 using a camera 137 included in a wireless handheld device 131 and selectively retrieve video-related data captured at the activity for display by a user video display devices.

An activity organization module 152 can be provided with the server 150 that is adapted to organize video captured by users at the activity using a cameras 131-134 including a camera 137, where videos of various perspectives of the activity 110 are provided to the server 150, and wherein the video is automatically organized by the server based on identifying data including at least one of: activity title, activity time, activity date, activity place, location (e.g., GPS stamp as a location data tag) of wireless handheld device at time of video recording. The activity organization module can be further adapted to provide a user selective access to the organized video from the server based on a request from the user of at least one of: activity title, activity time, activity date, activity place, and wireless handheld device location at time of video recording. Camera orientation, location and direction can also be features that are used as information associated with an electronic tag included with video images.

A community association module 153 can be provided with the server 150 that is adapted to associate registered users with online communities (e.g., membership group) also registered within the server 150 and to provide a user selective access to organized video of activity captured using a camera 137 included in a wireless handheld device 131 by registered community members attending an activity and which are provided to the server 150. Video can then be provided to all registered users of the community from the server 150 based on a request from the registered community user of at least one of: activity title, activity time, activity date, activity place, wireless handheld device location at time of video recording.

A video synchronization module 154 can be provided with the server as shown in FIG. 2, or with the remote client (e.g., HDTV, set-top box, and other video display devices not shown in FIG. 2). The video synchronization module 154 when provided is adapted to simultaneously play/replay video captured from different visual perspectives of an activity in synchronization with each other based on the time that the simultaneous videos were captured. Synchronization is possible using time stamp information embedded as data tagging information in video data associated with streaming video.

Those skilled in the art can appreciate that although real time video data may be transmitted to server 100, past captured video images can also be stored/archived within server 100 and transferred to user display devices such as hand held device 131 for display at display. For example, instant replays may be transferred as video data to hand held device 131 upon the request of a user of hand held device 131 at a venue, or a user watching an activity from home can request the replay for display on a high definition television set, or through a video router, on a computer or on a handheld device. Such instant replay footage can be displayed on display screen of various, data network enabled devices for the user to view.

Figure 3:
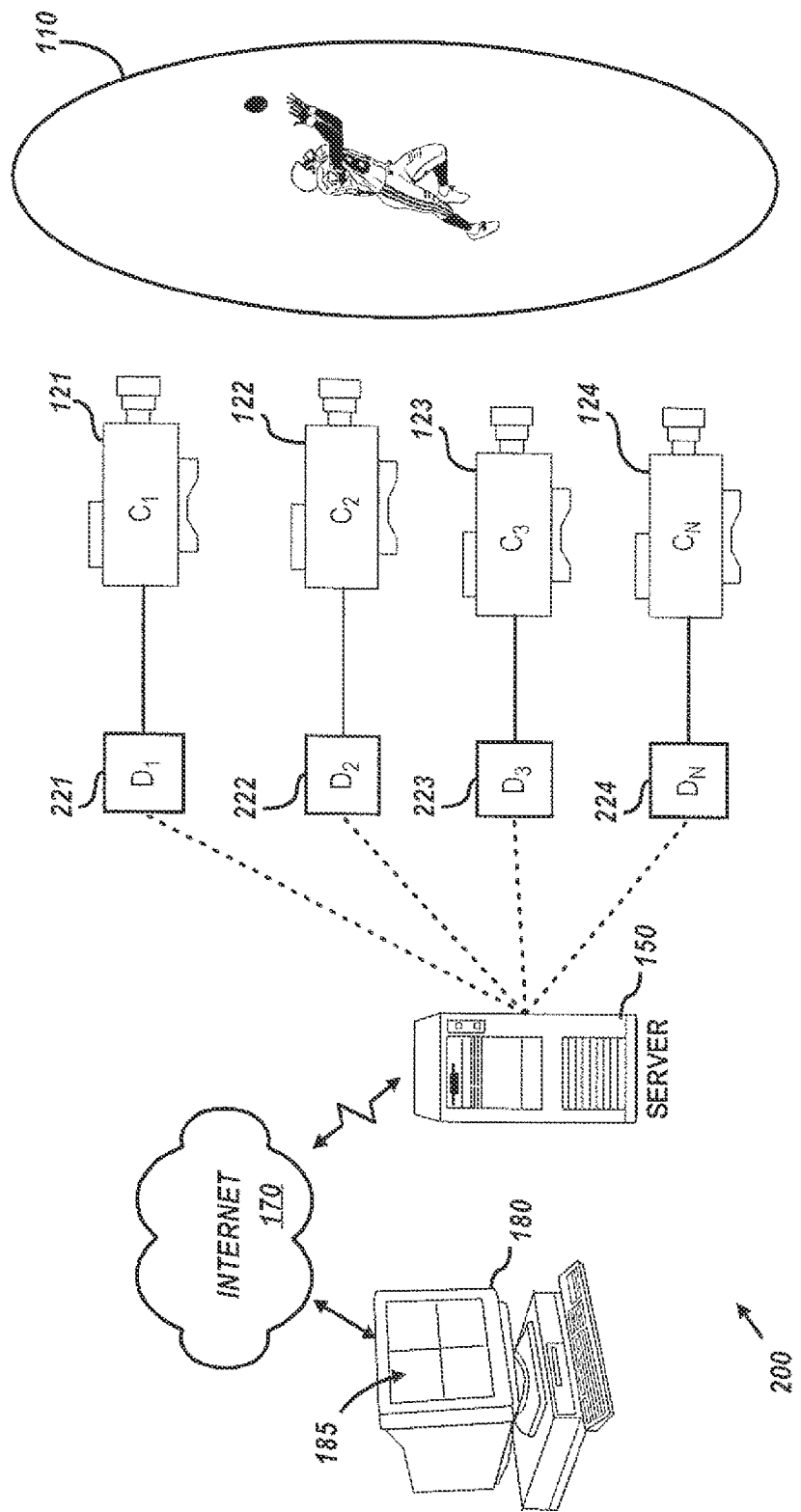
FIG. 3 illustrates a block diagram of cameras recording video data of an activity for storage in a server and a remote client accessing the stored video from the sever over a data network.

Referring to FIG. 3, a block diagram 200 of cameras 131-134 recording video data 221-224 of an activity 110 for storage in a server 150 and a remote client 180 having a display 185 and adapted to access the stored video data 221-224 from the sever 150 over a data network 170.

Figure 4:
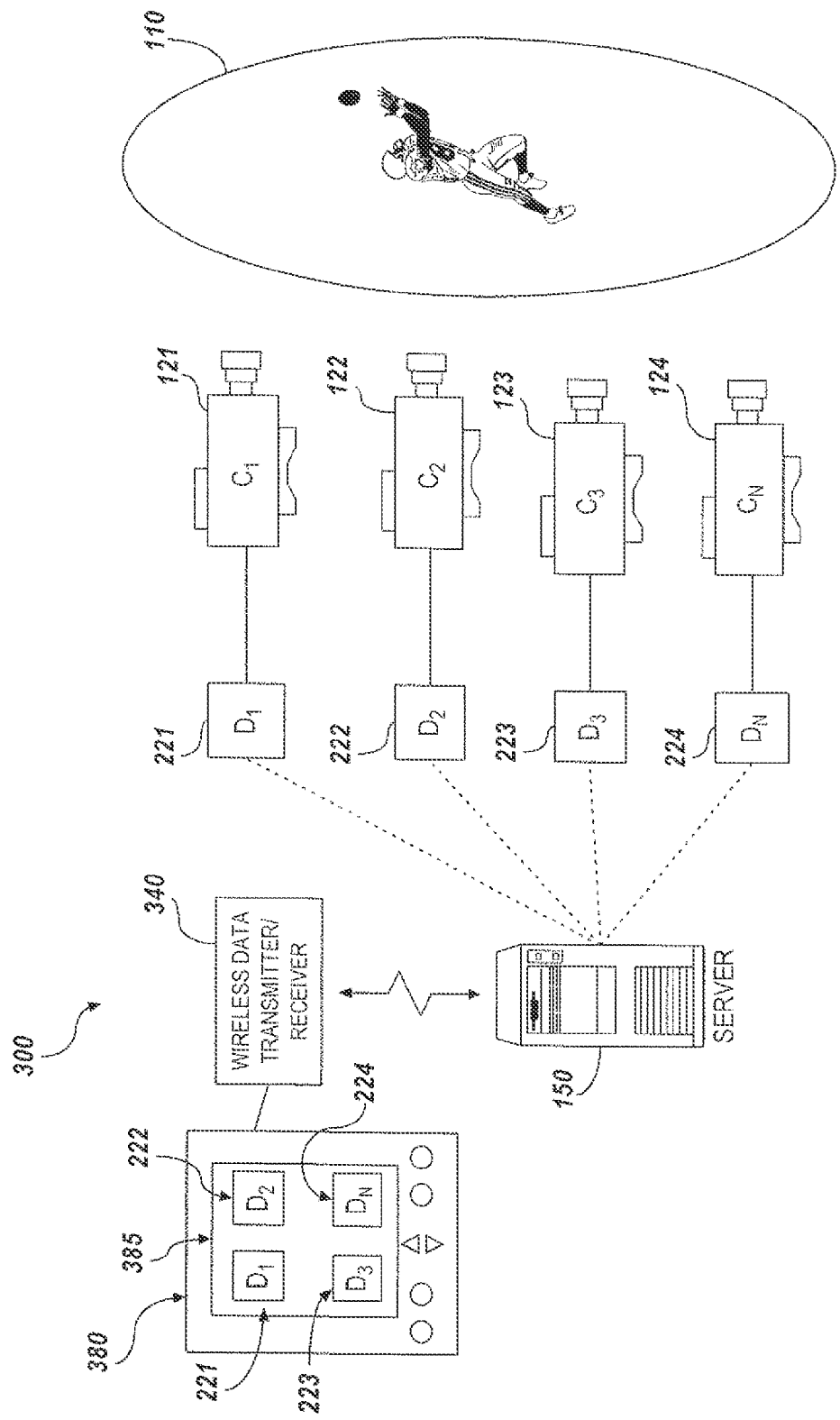
FIG. 4 illustrates a block diagram of cameras recording video data of an activity for storage in a server and a handheld multimedia device, capable of viewing video, accessing captured video as streaming data from the server through a wireless data communications network and/or as a broadcast.

Referring to FIG. 4, a block diagram 300 of cameras 121-124 recording video data 221-224 of an activity 110 for storage in a server 150 and a handheld multimedia device 380 having a display screen 385 and capable of viewing the video data 221-224 by accessing the video data 221-224 from the server 150 through a wireless data communications network as streaming video and/or as a broadcast. Server 100 can also communicate with handheld devices through a wireless cellular communication network (e.g., 3G, HSPA/HSDPA, Edge, WiMAX, COMA, or other wireless communication means). A wireless data transmitter/receiver 340 capable of supporting the wireless data communications can be integrated with hand held device 380.

Figure 5:
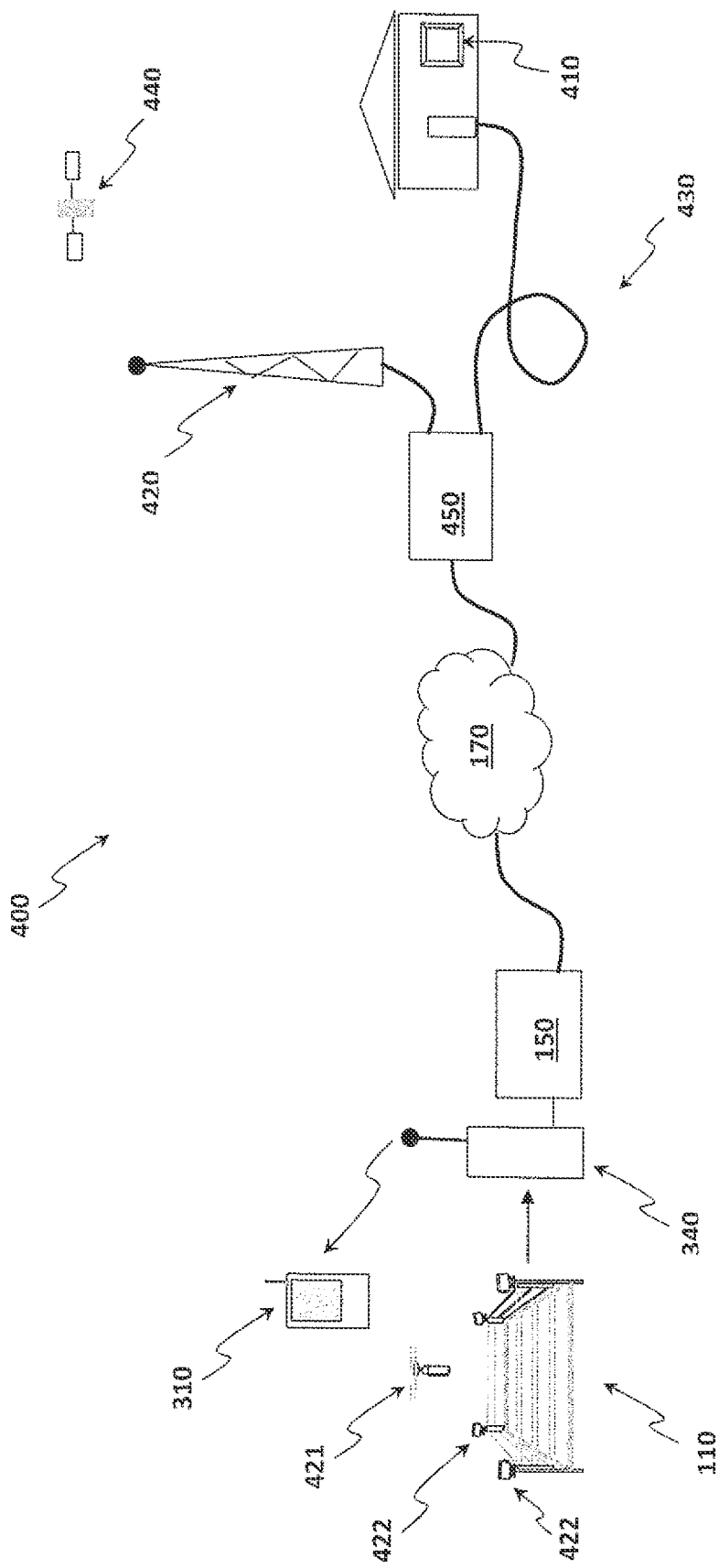
FIG. 5 illustrates a system diagram of video captured by cameras at an activity provided to a server and the video data provided to wireless handheld devices located near the activity through data communications hardware, and also data provided by data communication hardware through a data network to remote multimedia content provider hardware for transmission via cable, radio frequency transmission or satellite to a multimedia presentation device (e.g., high definition television, set-top box, computer or handheld devices located away from the activity)

Referring to FIG. 5, a system diagram 400 of video captured by cameras 421-422 at an activity 110 provided to a server 150 and the video data provided to wireless handheld devices 310 located near the activity through data communication hardware 340. Data can also provided by data communication hardware 340 through a data network 170 to remote multimedia content provider hardware 450 for transmission via cable 430, radio frequency transmission 420 or satellite 440 to a multimedia presentation device 410 (e.g., high definition television, set-top box used with satellite and cable television service such as devices provided by TiVo™, computer or handheld devices located away from the activity 110) is illustrated. In the illustration, the example activity 110 is shown as a boxing ring incorporate cameras surrounding the ring and synchronized in a master-slave relationship located over the ring for automated the capture of video using master-slave camera technology. Servers and multimedia devices referred to herein can include systems such as those supported by subscription services (e.g., digital cable television and satellite television providers) and digital recording equipment. Thereafter, multiple camera view data can be viewed and replayed via cable or satellite to a users/subscriber's remote viewer (e.g., HDTV display, set-top boxes).

Those skilled in the art can appreciate that wireless networks and servers can also receive and retransmit other data, in addition to video data. For example, a server or other computer system may be integrated with wireless network to provide team and venue data, which can then be transferred to wireless data transmitter receiver from wireless network and displayed thereafter as team and venue information within display screen of a users display device. Other data that may be transferred to hand held device for display include real-time and historical statistics, purchasing, merchandise and concession information, and additional product or service advertisements.

Data can also include box scores, player matchups, animated playbooks, shot/hit/pitch charts, historical information, and offense-defense statistics. In a concert venue, for example, as opposed to a sporting event, information pertaining to a particular musical group can be also transferred to the hand held device, along with advertising or sponsor information. Note that both the video data and other data described above generally comprise types of venue-based data. Venue-based data, as referred to herein, may include data and information, such as video, audio, advertisements, promotional information, propaganda, historical information, statistics, event scheduling, and so forth, associated with a particular venue and generally not retrievable through public networks. Information data can be transmitted together with video data received from data transmitter, Such information may be displayed as streaming data within a dedicated display area of a user's video display or simply stored in a database for later retrieval by the user.

A wireless gateway 124 and server 150 can be associated with a wireless network implemented in association with stadium venue 100. Those skilled in the art can appreciate that such a wireless network can be geographically located in a stadium venue 100, or the immediate surrounding area. It should also be appreciated that a server can operate across a country and still operate as taught herein to register user, retrieve, store and provide video form/to registered users.

Capacity and transmission bandwidth are the only constraints for a multimedia delivery system. These limitations continue to be overcome with faster servers, optical data networks, and high bandwidth wireless data communication networks such as 3G cellular and WiMAX.

Figure 6:
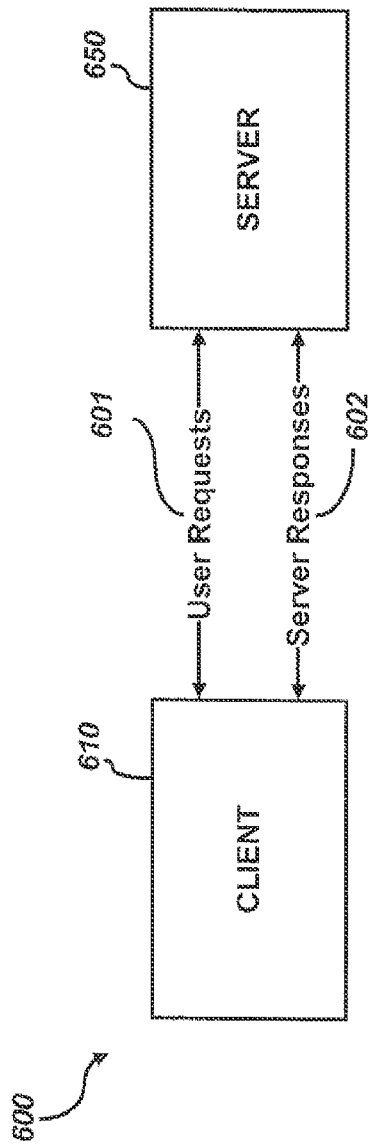
FIGS. 6-7 illustrates block diagrams of typical data flows and protocols in a data communications network.
Figure 7:
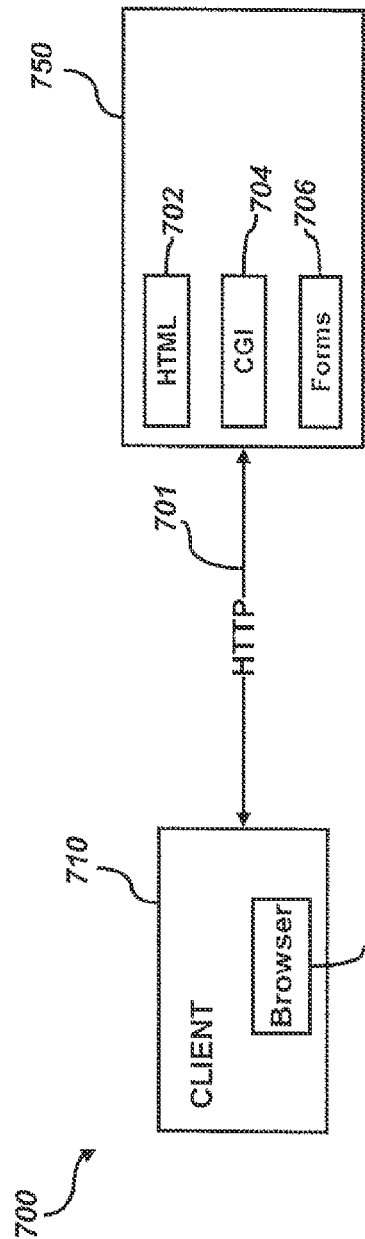
Figure 8:
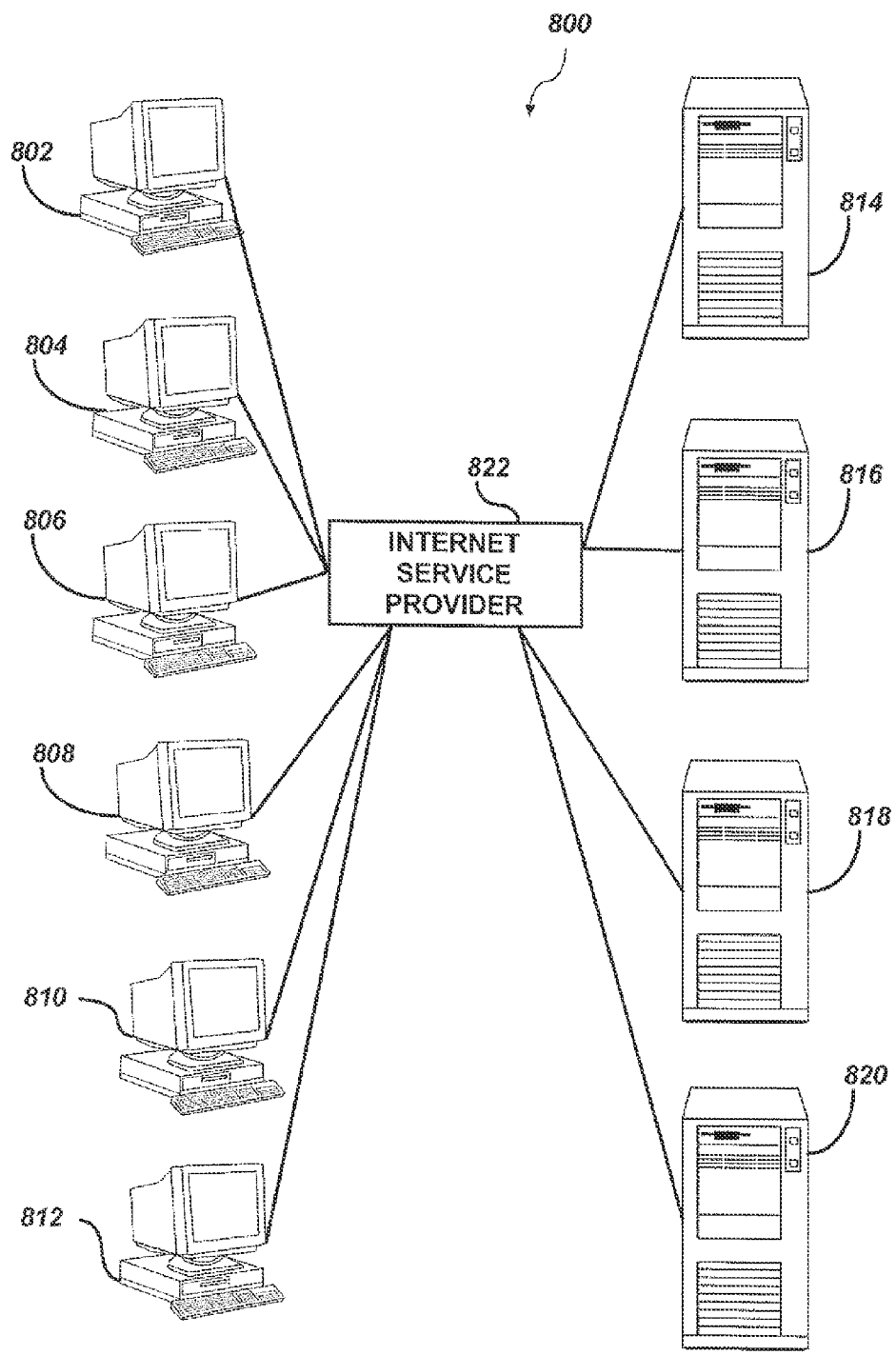
FIG. 8 illustrates a data network system diagram for a typical client, server, data network, Internet service provider communications arrangement.

It can be appreciated by those skilled in the art that the system illustrated with respect to FIGS. 6 to 8 generally describes an example of one type of computer network in which the embodiments disclosed can be implemented. It can be appreciated that other types of computer networks can also be utilized in accordance with alternative embodiments of the present invention, such as, for example, token ring networks, Intranets or organizationally dedicated computer networks rather than a more open computer network, such as the Internet. FIGS. 6-8 are thus presented for illustrative purposes only and are not considered limiting features of the system as data network communications systems continue to evolve and improve. Note that the term "Internet" is well known in the art and is described in greater detail herein. Also note that the client/server architecture described in FIGS. 6-8 represents merely an exemplary embodiment. It is believed that the present invention can also be embodied in the context of other types of network architectures, such as, for example company "Intranet" networks, wireless communication networks, cellular (3G, HSDPA or high-speed downlink packet access which is part of the high speed packet access family of protocols, and future, e.g., HSPA+, etc. as released), WiMAX, and the like.

FIG. 6 illustrates a block diagram illustrative of a client/server architecture system 600 in which one or more embodiments can be implemented. As indicated in FIG. 6, user requests 601 for data can be transmitted by a client 610 (or other sources) to a server 650. Server 650 can be analogous, for example, to sever 100 described earlier herein. Server 650 can be implemented as a remote computer system accessible over the Internet, the meaning of which is known, or other communication networks. Server 650 can perform a variety of processing and information storage operations. Based upon one or more user requests, server 650 can present the electronic information as server responses 602 to the client process. The client process may be active in a first computer system, and the server process may be active in a second computer system, communicating with one another over a communications medium, thus providing distributed functionality and allowing multiple clients to take advantage of information processing and storage capabilities of the server, including information retrieval activities such as retrieving documents from a managed service environment.

FIG. 7 illustrates a detailed block diagram of a client/server architectural system 700 in which one or more embodiments can be implemented. Although the client 710 and server 750 are processes that are generally operative within two computer systems, such processes can be generated from a high-level programming language, which can be interpreted and executed in a computer system at runtime (e.g., a workstation), and can be implemented in a variety of hardware devices, either programmed or dedicated.

Client 710 and server 750 communicate utilizing the functionality provided by HTTP 701. Active within client 710 can be a first process, browser 715, which establishes connections with server 750, and presents information to the user. Any number of commercially or publicly available browsers can be utilized in various implementations in accordance with one or more embodiments. For example, a browser 715 can provide the functionality specified under HTTP 701. A customer administrator or other privileged individual or organization can configure authentication policies, as indicated herein, using such a browser 715.

Server 750 can execute corresponding server software, such as a gateway, which presents information to the client in the form of HTTP responses 701. A gateway is a device or application employed to connect dissimilar networks (i.e., networks utilizing different communications protocols to serve digital television customers) so that electronic information can be passed or directed from one network to the other. Gateways transfer electronic information, converting such information to a form compatible with the protocols used by the second network for transport and delivery. Embodiments can employ Common Gateway Interface (CGI) 704 for such a purpose.

In computer to computer environments where a data network such as the Internet is used to transfer data, the HTTP responses 701 generally correspond with "Web" pages represented using HTML 702, or other form data 706 generated by server 750. Server 750 can provide HTML 702. The Common Gateway Interface (CGI) 704 can be provided to allow the client program to direct server 750 to commence execution of a specified program contained within server 750. Through this interface, and HTTP responses 701, server 750 can notify the client of the results of the execution upon completion.

FIG. 8 illustrates a high-level network diagram illustrative of a computer network 800, in which embodiments can be implemented. Computer network 800 can be representative of the Internet, which can be described as a known computer network based on the client-server model discussed herein. Conceptually, the Internet includes a large network of servers 814-820 that are accessible by clients 802-812, typically users of personal computers, through an Internet service provider 822.

Each of the clients 802-812 can operate a browser 715 to access one or more servers 814-820 via service provider 822. Each server 814-820 can operate a so-called "Web site" that supports files in the form of documents and web pages. Clients 802-912 and server 814-820 can also operate as a peer-to-peer network, which is popular for data/file sharing. A network path to servers 814-820 can be generally identified by a Universal Resource Locator (URL) having a known syntax for defining a network collection. Computer network 800 can thus be considered a "Web-based" computer network.

Figure 9:
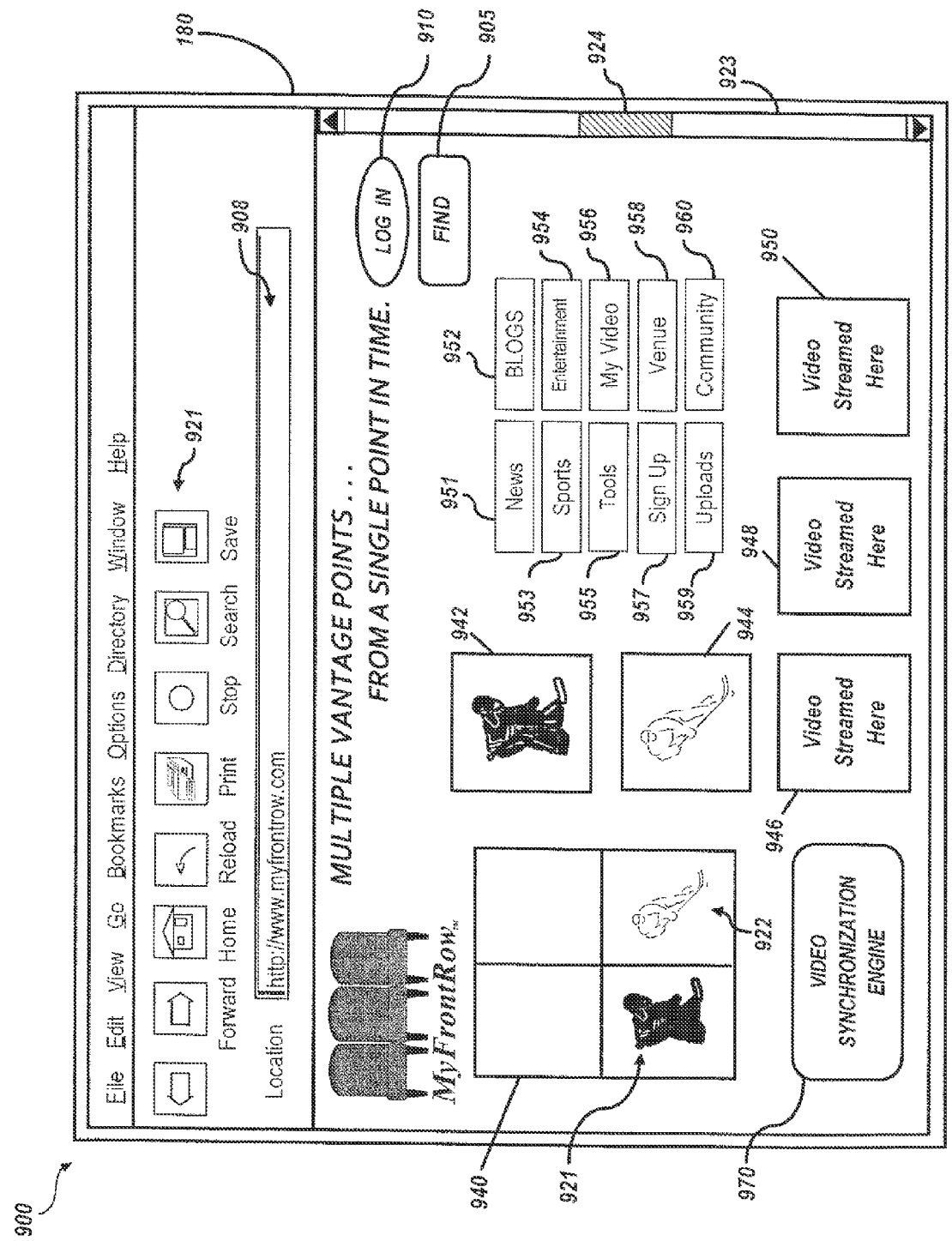
FIG. 9 illustrated a exemplary screen shot for a video archiving and subscription service entitled MyFrontRow™ which enables community and individual user registrations, video archiving, and video retrieval for video captured at activities by venue operators, fans and privately owned, video camera-enabled, handheld device users.

FIG. 9 illustrates a pictorial view of a sample graphical user interface "web page" window 900 that can be implemented as a graphical user interface display in accordance with features of the present invention. Those skilled in the art will appreciate that the term "webpage" refers simply to a "page" of an Internet "web" site. The term "homepage" is commonly utilized in the Internet computer networking arts to refer to a primary web page or primary web "site". Subsets or specific related areas can be referred to simply as "pages." FIG. 9 illustrates a web browser-based graphical user interface "window" 900 in which multiple perspectives of activity taking place within a venue such as venue 100 can be selected by a user and displayed within the display screen of a client such as 802 that is in communication with a server 150 via the Internet 800. Window 900 can display, for example, a web browser application. Where multiple visual perspectives of the same activity are available, they can be simultaneously displayed in separate display areas as will be further described. Additionally, where video has been time tagged (e.g., using Atomic dock, UTC time and GPS, as previously described), video can be synchronized to run simultaneously so that more than one visual perspective of the same activity can be seen at the same time. This provides the user a greater viewing experience. A display area streaming a particular view of interest to the user can be selected and enlarged (blown up) up to a full screen view for enhanced viewing. Streaming videos can be reversed, forwarded and replayed at will by the user. All video streams, when synchronized, can be reversed, forwarded and replayed in synchronization where the video are data tagged as described herein.

Icons 921 are generally displayed within the web browser application which can permit a user to implement web browser commands. In graphical user interface environments, icons are typically small graphical images displayed to represent objects that can be manipulated by a user via a pointing device such as a mouse. For example, the icon entitled "Find" 905 can be utilized to implement a command that instructs the web browser application to search for a particular web page or database content. The icon entitled "Sign in" 910 enables registered users to log into the server 150 and utilize its multimedia data services and tools 955 to upload video or retrieve videos. Videos can be searched for using video "Find" 905 button, which can bring up a search engine or search fields. The current hypertext address of the displayed web page is shown as Universal Resource Locator (URL) address 908. Thus, the current URL for the displayed web page is "http://www.myfrontrow.com". Window 900 can include a scroll bar 923, used with an up-arrow feature, and a down-arrow feature. An elevator 924 permits a user to scroll up and down a displayed web page to view portions of the web page not currently displayed within window 900. Button 960 to be used to find a community or group, or register with a community as a member. Communities can be used for private group members to privately share video from multiple perspective of a related activity which is of interest to the community, Graphical video images 921 and 922, which are images of different perspective captured simultaneously of the same activity, can be displayed simultaneously within window 900. Images 921 and 922 can be viewed within a video display area such as, for example, video display area 940, which is graphically displayed in a "split screen" format. A variety of other display areas 942-950 can also displayed photographs and videos within window 900. Video data associated with live action video images displayed within video display area 940 can be displayed within these display areas. Live action video data from other various venues can be displayed simultaneously within display areas 942-950. Selection buttons 951, 952, 953 and 954, when selected by a user, can permit a user to view various recorded and live video perspectives via the web page 900, including multiple perspective of activities including events taking place within a venue such as venue 100 or via cameras such as video cameras 121, 122, 123, 124 and mobile handheld video camera 137.

Various selection buttons and hypertext links are displayed within homepage window which contain links to other web "pages" or portions of web site associated with the URL—www.myfrontrow.com. For example, selection button 951, when selected by a user, permits the user to access and post video data to an associated web page with the topic "news". Similarly, Selection button 952, when selected by a user permits the user to access and/or post video data of interest to a Biog. Selection button 953, for example, permits the user to access and post video data to an associated web page dealing with the topic "sports". A mouse click on the selection button 954 permits a user to access "Entertainment" other than sports such as movies or shows. Selection button 955, when selected by a user, permits a user to access tools that will enable the user to manage video images streamed to web page 900, such as, for example, video images 921 and 922 associated with the events taking place within venue 100. Selection of button 956 will enable a user to access the user's private videos (e.g., for viewing or uploading and deletion). Button 957 enables users to "sign up" to the web site and its services. Selection button 958, when selected by a user, enables the listing of various venues available for video display. Selection button 958, when accessed by a user, can also permit the user to retrieve live streaming video and audio entertainment data from a user's preferred (or registered) venues such as, for example, venues 100, or a private activity. Button 959 enables users to view recent videos uploaded into the website, e.g., the www.myfrontrow.com website. Finally, button 960 enables users to search for communities and register with communities of interest to the member. Button 960 also enables the user to access tools for setting up/register new communities and enable invited party access by setting up usernames and passwords for guests.

The Video Synchronization Engine 970 button invokes the synchronization capabilities, either at the server or on the remote viewers/devices and enables simultaneous video play and replay synchronization based on "timing" data embedded in streamed videos. With video synchronization, video streams of images 921 and 922, as well as 942 an 944, can be displayed on display 900 in synchronicity based on the time (e.g., GPS-UTC, Atomic clock) that the videos were recorded at the same activity. For optimum viewing the display 900 and its individual windows can be expanded to a full screen view (and reduced again) using features available currently with most media players.

It should be appreciated that remote viewers/devices that take advantage of access to multimedia, synchronized camera views can not only include venue-based hand held devices and Internet connected computer, but can include remote video receiving systems monitors such as those offered from cable and satellite service provider with enhanced digital capabilities such as high definition television (HDTV) formatting, or other digital enabled viewing systems and devices that might come into to use in the form of a home multimedia server used for providing home-based customers with enhanced multimedia entertainment access and control. It can now be appreciated that, when multiple visual perspectives of the same activity are available, multiple videos can be simultaneously displayed in separate display areas (e.g., split screens) on the video screen in a similar manner as described with respect to the GUI in FIG. 9. Time tagged video can be synchronized to run simultaneously on the television screen, whether it is an HDTV bid screen, or a projection based screen) so that more than one visual perspective of the same activity can be seen, in synchronicity, at the same time. Like a computer mouse is typically used to navigate around a screen and select media in a computer, a wireless remote control can be used to navigate about the content being displayed on a large video screen to display single or multiple views of live or recorded video streams from content providers (e.g., cable and satellite programming providers providing on demand sports programming). Set-top boxes can be enabled with programming that will allow, via wireless remote control, for user navigation and selection of video perspective for display and can also enable rewinding, fast forwarding, pause and replay capabilities which are already available on set-top boxes as associated remote controls for viewing single perspective videos. Enhanced functionality in accordance with unique features of the present invention provides a greater viewing experience by programming customers.

With teaching of the present invention, it can even be envisaged that multiple perspectives can be recorded for movies and shows by filmmakers and producers of the "Movie Industry" in order to enhance home video entertainment. Although movie theatres are still routinely attended, home video rental or on-demand video streams purchases are becoming a much larger part of the movie industries revenue stream. In fact, new movie releases are being provided in DVD sales and rental and online services very shortly after their debut and theatre runs. With this in mind, it can be appreciated that enhanced movie releases for the home entertainment market can include, for example, four perspectives of an action scene that can be viewed simultaneously in a split screen format similar to the presentation format shown on the display 185 in FIG. 3, on a home-based video monitor such as the monitor HDTV 410 mentioned in FIG. 4. Flat panel displays and home theatre rear projections screen are so large today that they can support simultaneous display. Flat panels displays are now widely available to consumers at sizes up to sixty-five inches (65°) measured diagonally.

The different vantage points or perspectives can be of a single character or of different characters at different location operating at the same time in a movie scene, such as the perspective shown of two hockey players 921, 922 shown in the split screen format 940 on the display 900 described in FIG. 9, which may be at different location on the playing field for the game. Such distributed, but synchronized scenarios became popular in the Fox™ television broadcast series "24", where several scenes of characters hypothetically operating at different locations at the same time were shown in split screen areas of the viewing display. This is only illustrative of how a concept of video synchronization would be amusing and valuable, depending on the application. A financial premium may be recognized for the sale of a recoded movie in a multiple perspective format, where a single perspective can be viewed at view disruption, or several views can be shown simultaneously in split screen synchronized format. Again, all recorded video streams, when synchronized using a video synchronization engine, can be reversed, forwarded and replayed in synchronization where the video is data tagged as described herein. Synchronization engine software can be configured to function automatically on the display or set-top box where simultaneous video perspectives are being streamed and timing information is available. With movies as another possible application for the present invention, it should be appreciated that the definition of "activity" herein should extend to movie-related entertainment media.

Figure 10:
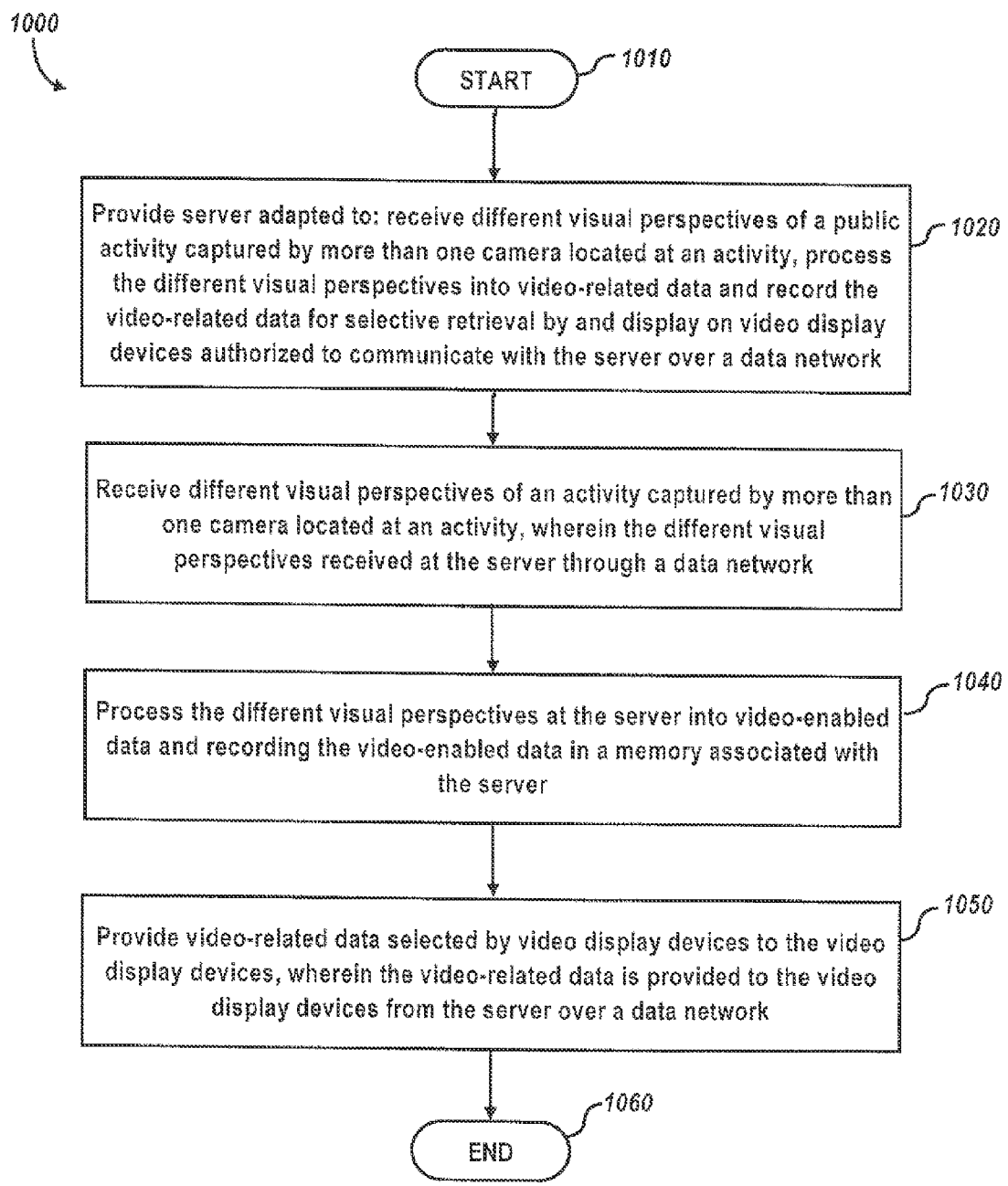
FIGS. 10, 11, 12, 13 and 14 respective illustrate flow diagrams of various methods for providing increased remote video viewing opportunities of activities including private activities and public activities that occur at entertainment venues and within physical communities to a remote audience, in accordance with features of the present invention.

Referring to FIG. 10, a flow diagram 1000 of a method for providing increased remote video viewing opportunities of activities including private activities and public activities that occur inside outside of entertainment venues to a remote audience is illustrated, in accordance with features of the present invention. The method starts can begin as indicated at Block 1010. As illustrated at Block 1020, a server can be provided that can be adapted to: receive different visual perspectives of a public activity captured by more than one camera located at an activity, process the different visual perspectives into video-related data and record the video-related data for selective retrieval by and display on video display devices authorized to communicate with the server over a data network. Thereafter as described at Block 1030, different visual perspectives of an activity captured by more than one camera located at an activity can be received, wherein the different visual perspectives received at the server through a data network. As shown in Block 1040, the different visual perspectives are processed at the server into video-enabled data and recording the video-enabled data in a memory associated with the server. Then, as shown at Block 1050, video-related data selected by video display devices is provided to video display devices. The video-related data can be provided to the video display devices from the server over a data network. The method then ends at Block 1060.

Figure 11:
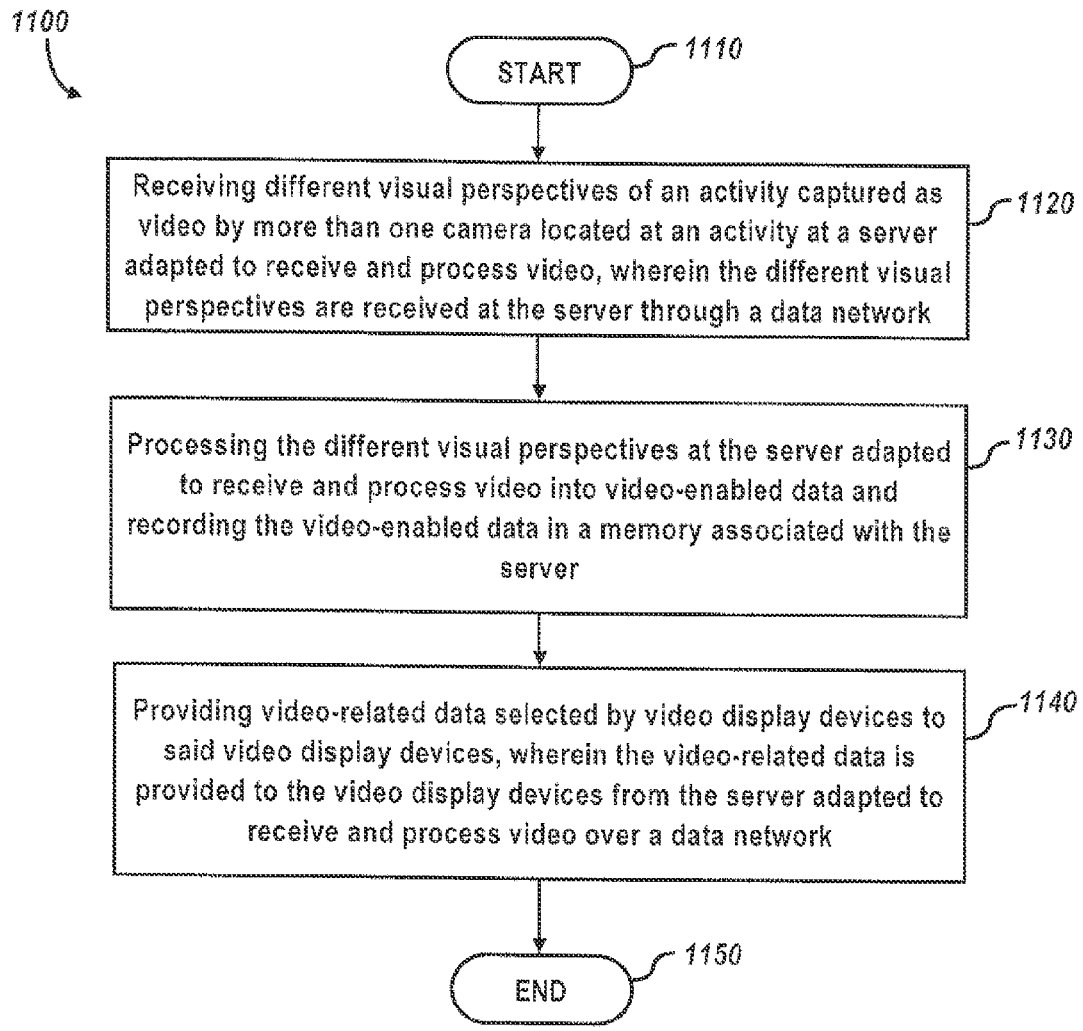

As illustrated in FIG. 11, a method is depicted that can provide increased remote video viewing opportunities of activities to a remote audience is illustrated. The method begins at Block 1110. Then as shown in Block 1120, different visual perspectives of an activity captured as video by more than one camera located at an activity at a server adapted to receive and process video are received. The different visual perspectives are received at the server through a data network. Thereafter, as illustrated at Block 1130, the different visual perspectives can be processed at the server adapted to receive and process video into video-enabled data and recording the video-enabled data in a memory associated with the server. Next, as described at Block 1140, video-related data selected by video display devices can be provided to video display devices. The video-related data can be provided to the video display devices from the server adapted to receive and process video over a data network. The method can then terminate as shown at Block 1150.

Figure 12:
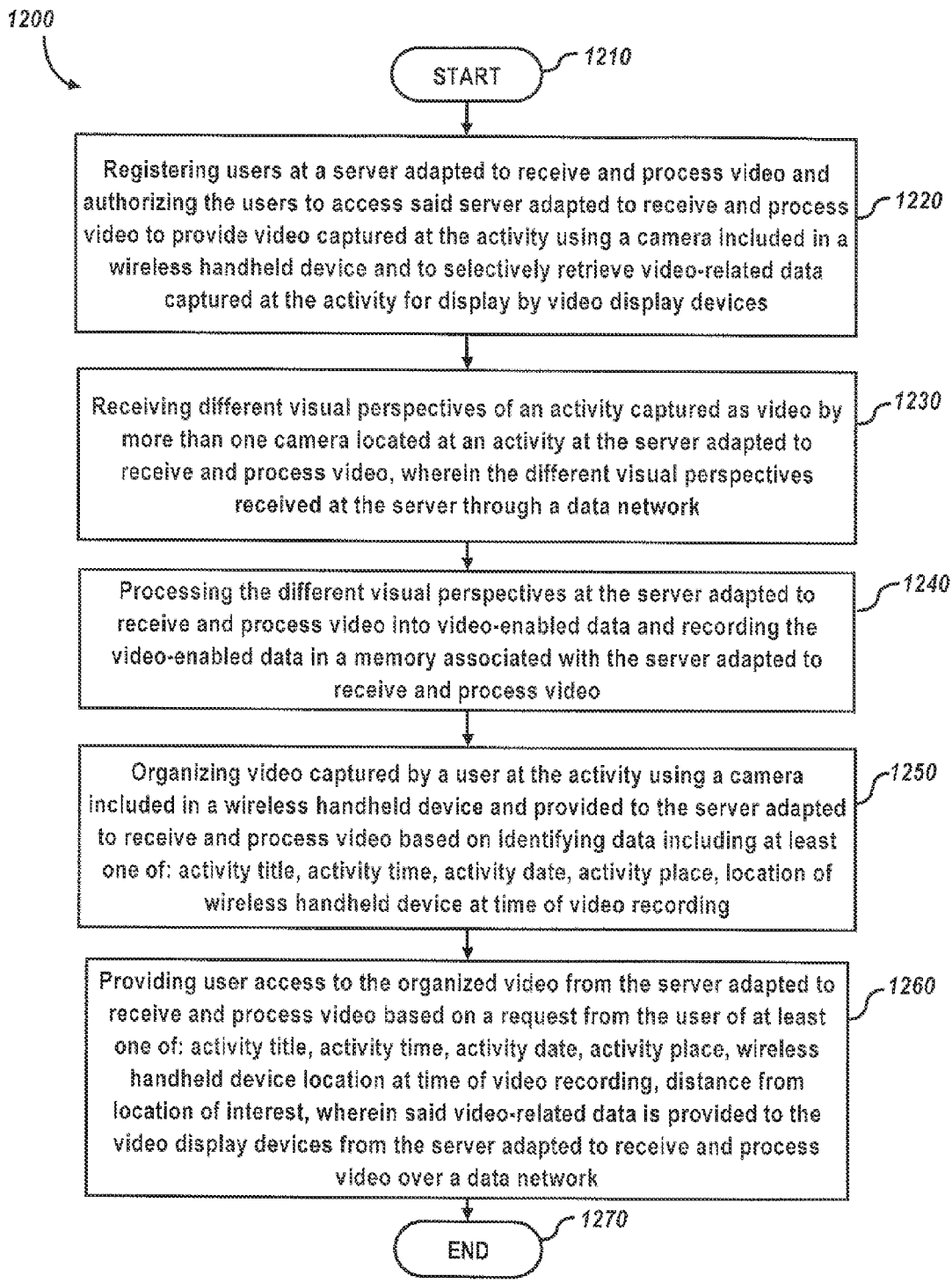

Referring to FIG. 12, a flow diagram of a method providing increased remote video viewing opportunities of activities to a remote audience is illustrated. The method begins at Block 1210. Thereafter, as described in Block 1220, users can be registered at a server adapted to receive and process video and authorizing the users to access the server adapted to receive and process video to provide video captured at the activity using a camera included in a wireless handheld device and to selectively retrieve video-related data captured at the activity for display by video display devices. As described at in block 1230, different visual perspectives of an activity captured as video by more than one camera located at an activity are received at the server adapted to receive and process video. The different visual perspectives can be received at the server through a data network. Thereafter, as depicted at Block 1240, the different visual perspectives are processed at the server adapted to receive and process video into video-enabled data and then recorded in a memory associated with the server adapted to receive and process video. As indicated next at Block 1250, video captured by a user at the activity using a camera included in a wireless handheld device and provided to the server adapted to receive and process video are processed based on identifying data including at least one of: activity title, activity time, activity date, activity place, location of wireless handheld device at time of video recording. Then as shown in Block 1260, user access is provided to the organized video from the server adapted to receive and process video based on a request from the user of at least one of: activity title, activity time, activity date, activity place, wireless handheld device location at time of video recording. The video-related data can be provided to video display devices from the server adapted to receive and process video over a data network. The method can then terminate as indicated at Block 1270.

Figure 13:
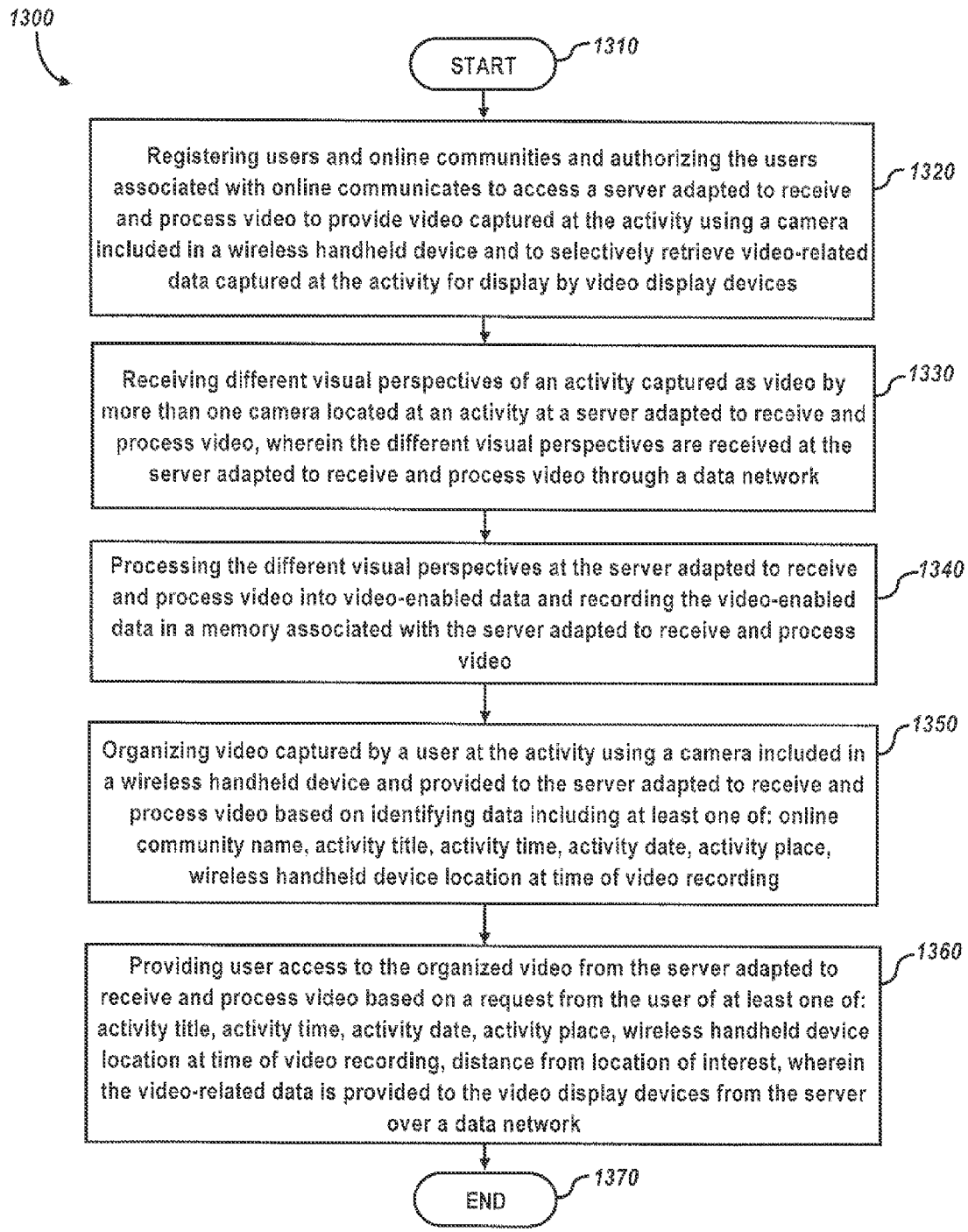

Referring to FIG. 13, a method providing increased remote video viewing opportunities of activities to a remote audience is illustrated. The method begins at block 1310. As depicted next at Block 1320, users and online communities (e.g., memberships, groups) are registered at a server adapted to receive and process video and authorizing the users associated with online communicates to access the server adapted to receive and process video to provide video captured at the activity using a camera included in a wireless handheld device and to selectively retrieve video-related data captured at the activity for display by video display devices. Thereafter as described and in Block 1330, different visual perspectives of an activity captured as video by more than one camera located at an activity are received at a server adapted to receive and process video. The different visual perspectives are received at the server adapted to receive and process video through a data network. Then next, as illustrated in Block 1340, the different visual perspectives can be processed at the server adapted to receive and process video into video-enabled data and can be recorded the video-enabled data in a memory associated with the server adapted to receive and process video. Thereafter, as described at Block 1350, video captured by a user at the activity using a camera included in a wireless handheld device and provided to the server adapted to receive and process video and can be organized based on identifying data including at least one of: online community name, activity title, activity time, activity date, activity place, wireless handheld device location at time of video recording. As shown in Block 1360, user access can be provided to the organized video from the server adapted to receive and process video based on a request from the user of at least one of: activity title, activity time, activity date, activity place, wireless handheld device location at time of video recording, wherein the video-related data is provided to the video display devices from the server adapted to receive and process video over a data network. The method can then terminate, as indicated at Block 1370.

Figure 14:
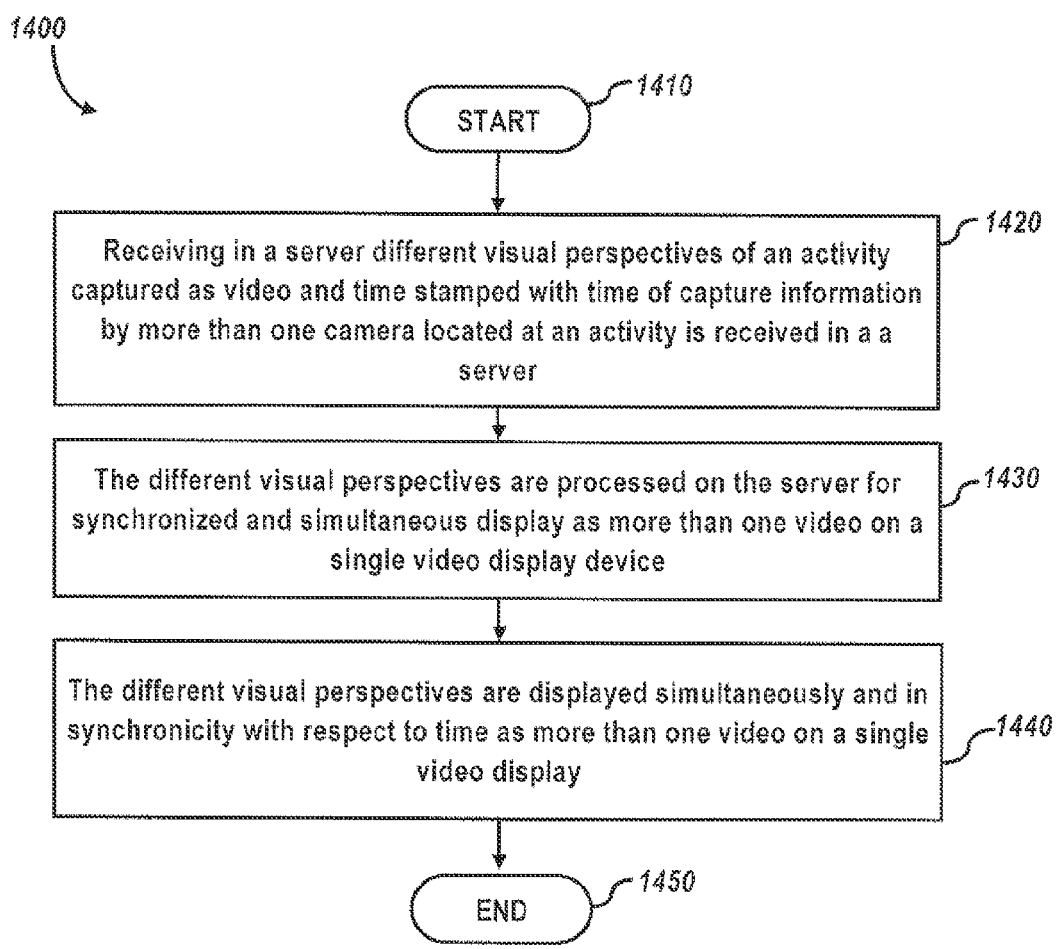

Referring to FIG. 14, a method providing synchronized viewing of more than one visual perspective recorded in video format by a remote audience is illustrated. The method begins at block 1410. As depicted next at Block 1420, receiving in a server different visual perspectives of an activity captured as video and time stamped with time of capture information by more than one camera located at an activity is received in a server. As shown in Block 1430, the different visual perspectives are processed on the server for synchronized and simultaneous display as more than one video on a single video display device. As shown in Block 1440, the different visual perspectives are displayed simultaneously and in synchronicity with respect to time as more than one video on a single video display. The method can then terminate (and the end of a user's viewing session), as indicated at Block 1450, The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description set forth is not intended to be exhaustive or to limit the invention to the precise form disclosed. Many modifications and variations are possible in light of the above teaching without departing from the spirit and scope of the following claims.

The invention claimed is:

1. A system for remote viewing of at least one activity from at least two different visual perspectives to a remote audience, said system comprising:
   a server to receive the at least two different visual perspectives of the at least one activity simultaneously captured during the at least one activity as a streaming video signal by a combination of at least one of a plurality of cameras singularly included in each of at least one of a plurality of hand held devices and at least one of a plurality of standalone cameras, all located near the at least one activity;

said server having circuitry to process the streaming video signal into video-related data and record the video-related data in a database associated with said server;

selection means to selectively retrieve said streaming video signal and display said video-related data by at least one of a plurality of remote video display devices authorized to communicate with the server and retrieve streaming video-related data over a data network; and a registration module to register the at least one of a plurality of remote video display devices and authorize access to said server.

2. The system of claim 1 wherein said server communicates with at least one of a plurality of wireless hand held devices, wherein each of said at least one of said plurality of wireless hand held devices includes integrated components comprising a GUI based menu driven touch screen display and a video processing unit with video tuning hardware to select segments of the streaming video signal viewable on said GUI based menu driven touch screen display as real time or pre-recorded video footage.

3. The system of claim 1 wherein the registration module authorizes access to said server to retrieve the streaming video signal of the at least two different visual perspectives from said database.

4. The system of claim 1, wherein the registration module authorizes access to said server to upload the streaming video signal into said database of the at least one activity captured by the combination of the at least one of said plurality of cameras and the at least one of said plurality of standalone cameras camera.

5. The system of claim 4, further comprising an activity organization module to organize the streaming video signal uploaded into said database from a combination of streaming video signals emanating from the at least one of said plurality of cameras and the at least one of said plurality of standalone cameras, wherein video from the streaming video signal is automatically organized by said server based on at least one of: at least one activity title, an activity time, an activity date, an activity place, a location of the at least one wireless handheld device at a time of a video recording of the streaming video signal.

6. The system of claim 2, further comprising an activity organization module to organize the streaming video signal simultaneously captured during the at least one activity by a combination of the at least one of said plurality of cameras and the at least one of said plurality of standalone cameras, located near the at least one activity and provided to said server, wherein said streaming video signal is automatically organized by at least one of said server based on at least one of: at least one activity title, an activity time, an activity date, an activity place, a location of the at least one of said plurality of wireless handheld devices at a time of recording of the streaming video signal.

7. The system of claim 1, wherein said registration module registers at least one remote video display device among the at least one of a plurality of remote video display devices and authorizes access to said server to selectively retrieve and display the streaming video-related data captured at the at least one activity.

8. The system of claim 2, further comprising an activity organization module to provide selective access to the streaming video signal of the at least two of said plurality of different visual perspectives from said server, wherein said streaming video signal is provided to at least one remote video display device among said remote video display devices from said server based on a request for at least one of: at least one activity title, an activity time, an activity date, an activity place, a location of the at least one of said plurality of wireless handheld devices at a time of video recording, and a distance from a location of interest.

9. The system of claim 2, further comprising a community association module to associate with at least one of a plurality of online communities also registered within said server and to provide selective access to the streaming video signal of the at least one activity stored on said server that were captured using a combination of the at least one of said plurality of cameras and the at least one of said plurality of standalone cameras, located near the at least one of said plurality of activities and stored on said server in association with the at least one online community, wherein the streaming video signal is provided from said server based on requests of at least one of: a name of said at least one of said plurality of online communities at least one activity title, an activity time, an activity date, an activity place, a location of the at least one of said plurality of wireless handheld devices at a time of a recording of the streaming video signal, and a distance from a location of interest.

10. The system of claim 2, further comprising a community association module to associate with at least one of a plurality of online communities also registered within said server and to provide selective access to the streaming video signal of activities stored in said database that were captured using a combination of the at least one of said plurality of cameras and the at least one of said plurality of standalone cameras, operated and located near the at least one activity and stored in said database in association with the at least one of said plurality of online communities, wherein said streaming video signal is provided from said server based on requests of at least one of: a name of the at least one of said plurality of online communities, an activity title, an activity time, an activity date, an activity place, a location of the at least one of said plurality of wireless handheld devices at a time of recording of the streaming video signal, and a distance from a location of interest.

11. A system for synchronized remote viewing of at least one of a plurality of activities from at least two of a plurality of visual perspectives to a remote audience, said system comprising:

a multimedia server including a video synchronization module, wherein said multimedia server comprises circuitry to simultaneously receive at least two visual perspectives captured during the at least one activity as video by a combination of at least one of a plurality of cameras singularly included in each at least one of a plurality of wireless hand held devices and at least one of a plurality of standalone cameras, wherein the combination of the at least one camera and the at least one standalone camera are configured to generate video image tags with time of capture information, and said video synchronization module processes the at least two visual perspectives into video-related data for selective retrieval and synchronized display on at least one of a plurality of remote video display devices comprising at least one of a plurality of hand held device displays; and a video synchronization engine for synchronizing the playing of video of the at least two visual perspectives of the at least one activity on the at least one of the plurality of remote video display devices based on time of capture information related to said video image tags on images.

12. The system of claim 11 wherein said at least one of said plurality of hand held device displays including an onboard video processing unit, an onboard GPS chipset, said onboard video processing unit having circuitry to process incoming and outgoing video furnished with GPS space and time coordinates on a toolbar screen inset.

13. A method for remote viewing of at least one activity from at least two different visual perspectives to a remote audience, said method comprising:

receiving via a server, the at least two different visual perspectives of the at least one activity simultaneously captured during the at least one activity as a streaming video signal by a combination of at least one of a plurality of cameras singularly included in each of at least one of a plurality of hand held devices and at least one of a plurality of standalone cameras, all located near the at least one activity;

processing the streaming video signal into video-related data and recording the video-related data in a database associated with said server via circuitry associated with said server;

selectively retrieving said streaming video signal and displaying said video-related data by at least one of a plurality of remote video display devices authorized to communicate with the server and retrieve streaming video-related data over a data network; and registering via a registration module, the at least one of a plurality of remote video display devices and authorizing access to said serve via a registration module.

14. The method of claim 13 wherein said server communicates with at least one of a plurality of wireless hand held devices.

15. The method of claim 14 wherein each of said at least one of said plurality of wireless hand held devices includes integrated components comprising a GUI based menu driven touch screen display and a video processing unit with video tuning hardware to select segments of the streaming video signal viewable on said GUI based menu driven touch screen display as real time or pre-recorded video footage.

16. The method of claim 13 wherein the registration module authorizes access to said server to retrieve the streaming video signal of the at least two different visual perspectives from said database.

17. The method of claim 13 wherein the registration module authorizes access to said server to upload the streaming video signal into said database of the at least one activity captured by the combination of the at least one of said plurality of cameras and the at least one of said plurality of standalone cameras camera.

18. The method of claim 16 wherein said server communicates with at least one of a plurality of wireless hand held devices.

19. The method of claim 18 wherein each of said at least one of said plurality of wireless hand held devices includes integrated components comprising a GUI based menu driven touch screen display and a video processing unit with video tuning hardware to select segments of the streaming video signal viewable on said GUI based menu driven touch screen display as real time or pre-recorded video footage.

20. The method of claim 17 wherein said server communicates with at least one of a plurality of wireless hand held devices and wherein each of said at least one of said plurality of wireless hand held devices includes integrated components comprising a GUI based menu driven touch screen display and a video processing unit with video tuning hardware to select segments of the streaming video signal viewable on said GUI based menu driven touch screen display as real time or pre-recorded video footage.

* * * * *